US011537998B2

(12) United States Patent
Rajamani et al.

(10) Patent No.: US 11,537,998 B2
(45) Date of Patent: Dec. 27, 2022

(54) CAPTURING MEETING SNIPPETS

(71) Applicant: HUDDL Inc., Santa Clara, CA (US)

(72) Inventors: Harish Rajamani, Hyderabad (IN); Krishna Yarlagadda, Sunnyvale, CA (US); Nava Davuluri, Sunnyvale, CA (US)

(73) Assignee: HUDDL Inc., Santa Clara, CA (US)

( * ) Notice: Subject to any disclaimer, the term of this patent is extended or adjusted under 35 U.S.C. 154(b) by 0 days.

(21) Appl. No.: 17/308,264

(22) Filed: May 5, 2021

(65) Prior Publication Data

US 2021/0367801 A1 Nov. 25, 2021

Related U.S. Application Data

(60) Provisional application No. 63/028,123, filed on May 21, 2020.

(51) Int. Cl.
| | |
|---|---|
| *H04L 12/18* | (2006.01) |
| *G06F 16/34* | (2019.01) |
| *G10L 15/26* | (2006.01) |
| *G06Q 10/10* | (2012.01) |
| *G06N 20/00* | (2019.01) |

(Continued)

(52) U.S. Cl.
CPC ....... *G06Q 10/1097* (2013.01); *G06F 3/0484* (2013.01); *G06F 16/345* (2019.01); *G06F 16/954* (2019.01); *G06N 20/00* (2019.01); *G06Q 10/1095* (2013.01); *G10L 15/1815* (2013.01); *G10L 15/22* (2013.01); *G10L 15/26* (2013.01); *G10L 25/57* (2013.01); *H04L 12/1818* (2013.01); *H04L 12/1831* (2013.01);

*H04L 51/52* (2022.05); *H04L 65/1096* (2013.01); *H04L 65/403* (2013.01);
(Continued)

(58) Field of Classification Search
CPC ............. H04L 12/1831; H04L 12/1818; G06F 16/345; G10L 15/26
See application file for complete search history.

(56) References Cited

U.S. PATENT DOCUMENTS

| 7,634,540 B2 | 12/2009 | Ivashin et al. |
|---|---|---|
| 9,113,032 B1 | 8/2015 | Mey et al. |

(Continued)

FOREIGN PATENT DOCUMENTS

| WO | 2019183195 A1 | 9/2019 |
|---|---|---|
| WO | 2019205271 A1 | 10/2019 |

OTHER PUBLICATIONS

Non-Final Office Action in U.S. Appl. No. 17/308,623 dated Jan. 20, 2022.

(Continued)

*Primary Examiner* — Kevin T Bates
*Assistant Examiner* — Nazia Naoreen
(74) *Attorney, Agent, or Firm* — Chip Law Group

(57) ABSTRACT

Provided is a method that includes identifying a trigger event initiated by at least one participant of the meeting. The trigger event is indicative of at least a reference to meeting metadata associated with the meeting. Further, the method includes recording the meeting for a determined duration to generate a plurality of meeting snippets, based on the identification of the trigger event. A meeting summary may be generated based on aggregating the plurality of meeting snippets and the meeting metadata.

20 Claims, 13 Drawing Sheets

(51) Int. Cl.
  *G06F 16/954* (2019.01)
  *G10L 15/18* (2013.01)
  *G10L 15/22* (2006.01)
  *G10L 25/57* (2013.01)
  *H04N 7/15* (2006.01)
  *H04L 65/401* (2022.01)
  *H04L 65/403* (2022.01)
  *G06F 3/0484* (2022.01)
  *H04L 65/1096* (2022.01)
  *H04L 51/52* (2022.01)
  *H04L 67/50* (2022.01)
  *H04N 21/8549* (2011.01)

(52) U.S. Cl.
  CPC ........ *H04L 65/4015* (2013.01); *H04L 67/535* (2022.05); *H04N 7/15* (2013.01); *H04N 21/8549* (2013.01)

(56) References Cited

U.S. PATENT DOCUMENTS

| | | | |
|---|---|---|---|
| 9,699,410 | B1 | 7/2017 | Nagabushanam |
| 10,255,946 | B1 * | 4/2019 | Andrizzi ............... G11B 27/026 |
| 10,484,189 | B2 * | 11/2019 | Albrecht ................ H04L 51/32 |
| 10,757,148 | B2 * | 8/2020 | Nelson ................ H04M 7/0027 |
| 10,999,346 | B1 | 5/2021 | Yang |
| 11,049,077 | B1 | 6/2021 | Vukich |
| 11,080,356 | B1 | 8/2021 | Kumar et al. |
| 11,095,468 | B1 | 8/2021 | Pandey et al. |
| 11,119,985 | B1 | 9/2021 | Alagianambi et al. |
| 11,120,199 | B1 * | 9/2021 | Bachtiger ............. G06F 40/284 |
| 11,184,560 | B1 | 11/2021 | Mese et al. |
| 2004/0263610 | A1 | 12/2004 | Whynot et al. |
| 2009/0210933 | A1 | 8/2009 | Shear et al. |
| 2009/0222741 | A1 | 9/2009 | Shaw et al. |
| 2011/0072362 | A1 | 3/2011 | Denner et al. |
| 2011/0249073 | A1 | 10/2011 | Cranfill et al. |
| 2012/0066596 | A1 | 3/2012 | Feng et al. |
| 2012/0144320 | A1 | 6/2012 | Mishra et al. |
| 2012/0192080 | A1 | 7/2012 | Lloyd |
| 2013/0027502 | A1 | 1/2013 | Skramstad |
| 2013/0144950 | A1 | 6/2013 | Sanakaranarasimhan et al. |
| 2013/0191299 | A1 | 7/2013 | Hermsdorff et al. |
| 2013/0282820 | A1 | 10/2013 | Jabri et al. |
| 2013/0325972 | A1 | 12/2013 | Boston et al. |
| 2014/0006955 | A1 | 1/2014 | Greenzeiger et al. |
| 2014/0098180 | A1 | 4/2014 | Periyannan et al. |
| 2014/0188541 | A1 | 7/2014 | Goldsmith et al. |
| 2015/0081841 | A1 | 3/2015 | Pino et al. |
| 2015/0142800 | A1 | 5/2015 | Thapliyal |
| 2015/0358810 | A1 | 12/2015 | Chao et al. |
| 2016/0117624 | A1 | 4/2016 | Flores et al. |
| 2016/0307165 | A1 | 10/2016 | Grødum et al. |
| 2016/0350720 | A1 | 12/2016 | Moorjani et al. |
| 2017/0024100 | A1 | 1/2017 | Pieper et al. |
| 2017/0192656 | A1 | 7/2017 | Pedrick et al. |
| 2017/0270627 | A1 * | 9/2017 | Hodge ............... G06F 16/24578 |
| 2018/0046957 | A1 | 2/2018 | Yaari et al. |
| 2018/0077092 | A1 | 3/2018 | Jalil |
| 2018/0101760 | A1 | 4/2018 | Nelson et al. |
| 2018/0101824 | A1 | 4/2018 | Nelson et al. |
| 2018/0131904 | A1 | 5/2018 | Segal |
| 2018/0204128 | A1 | 7/2018 | Avrahami et al. |
| 2018/0241968 | A1 | 8/2018 | Chen |
| 2018/0270452 | A1 | 9/2018 | Moon et al. |
| 2018/0299864 | A1 | 10/2018 | Byers et al. |
| 2018/0331842 | A1 | 11/2018 | Faulkner et al. |
| 2019/0007649 | A1 | 1/2019 | Rensburg et al. |
| 2019/0052590 | A1 | 2/2019 | Katis et al. |
| 2019/0108834 | A1 | 4/2019 | Nelson et al. |
| 2019/0155471 | A1 | 5/2019 | Eccleston et al. |
| 2019/0172017 | A1 | 6/2019 | Burlin et al. |
| 2019/0273627 | A1 | 9/2019 | Whalin et al. |
| 2019/0312917 | A1 | 10/2019 | Choi et al. |
| 2019/0332994 | A1 | 10/2019 | Adamson et al. |
| 2019/0386839 | A1 | 12/2019 | Kosugi et al. |
| 2020/0092341 | A1 | 3/2020 | Wang et al. |
| 2020/0106735 | A1 | 4/2020 | Guerrier et al. |
| 2020/0134002 | A1 | 4/2020 | Tung et al. |
| 2020/0167371 | A1 | 5/2020 | Klym et al. |
| 2020/0341625 | A1 | 10/2020 | Roedel et al. |
| 2020/0374146 | A1 | 11/2020 | Chhabra et al. |
| 2020/0403817 | A1 | 12/2020 | Daredia et al. |
| 2021/0201935 | A1 | 7/2021 | Seethaler et al. |
| 2021/0226808 | A1 | 7/2021 | Zarakas et al. |
| 2021/0233036 | A1 | 7/2021 | Zarakas et al. |
| 2021/0243696 | A1 | 8/2021 | Sanaullah et al. |
| 2021/0245043 | A1 | 8/2021 | Shriram et al. |
| 2021/0264377 | A1 | 8/2021 | Ebner et al. |
| 2021/0306173 | A1 | 9/2021 | Krikunov et al. |
| 2021/0319408 | A1 | 10/2021 | Jorasch et al. |
| 2021/0344612 | A1 | 11/2021 | Files et al. |
| 2021/0352120 | A1 | 11/2021 | Masi et al. |

OTHER PUBLICATIONS

Non-Final Office Action in U.S. Appl. No. 17/308,329 dated Nov. 15, 2021.
Non-Final Office Action in U.S. Appl. No. 17/308,887 dated Dec. 22, 2021.
Non-Final Office Action in U.S. Appl. No. 17/308,916 dated Dec. 17, 2021.
Final Office Action for U.S. Appl. No. 17/308,916 dated May 5, 2022.
Final Office Action in U.S. Appl. No. 17/308,887 dated May 2, 2022.
Non-Final Office Action in U.S. Appl. No. 17/308,640 dated Mar. 15, 2022.
Notice of Allowance in U.S. Appl. No. 17/308,329 dated Mar. 30, 2022.
Advisory Action in U.S. Appl. No. 17/308,887 dated Jul. 15, 2022.
Advisory Action in U.S. Appl. No. 17/308,916 dated Jul. 27, 2022.
Corrected Notice of Allowability for U.S. Appl. No. 17/308,623 dated Aug. 24, 2022.
Corrected Notice of Allowance for U.S. Appl. No. 17/308,623 dated Jul. 7, 2022.
Corrected Notice of Allowance in U.S. Appl. No. 17/308,329 dated Jul. 18, 2022.
Final Office Action in U.S. Appl. No. 17/308,640 dated Jul. 13, 2022.
Non-Final Office Action for U.S. Appl. No. 17/308,586 dated Sep. 19, 2022.
Notice of Allowance in U.S. Appl. No. 17/308,623 dated Jun. 17, 2022.
Corrected Notice of Allowance for U.S. Appl. No. 17/308,623 dated Sep. 23, 2022.
Nguyen, Guided probabilistic topic models for agenda-setting and framing (Order No. 3711770). Available from ProQuest Dissertationsand Theses Professional. (1707358055). (Year: 2015).
Non-Final Office Action for U.S. Appl. No. 17/308,772 dated Sep. 26, 2022.
Non-Final Office Action for U.S. Appl. No. 17/308,887 dated Sep. 26, 2022.
Non-Final Office Action for U.S. Appl. No. 17/308,916 dated Oct. 21, 2022.

* cited by examiner

CAPTURING MEETING SNIPPETS

CROSS-REFERENCE TO RELATED APPLICATIONS/INCORPORATION BY REFERENCE

This application makes reference to, claims priority to, and claims benefit from U.S. Provisional Application Ser. No. 63/028,123, which was filed on May 21, 2020.

The above referenced application is hereby incorporated herein by reference in its entirety.

TECHNICAL FIELD

The presently disclosed embodiments are related, in general, to a meeting. More particularly, the presently disclosed embodiments are related to method and system for capturing snippets of meeting highlights.

BACKGROUND

Meetings, conducted over a communication network, involve participants joining the meeting through computing devices. In some examples, plurality of participants of the meeting may generate meeting data during a course of the meeting. Some examples of the meeting data may include, but not limited to, audio content (which may include a participant's voice/audio), video content (which may include participant's video and/or other videos), meeting notes input by the plurality of participants, presentation content, and/or like. Typically, after the meeting, the plurality of participants may want to refer to certain portions of the meeting.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A system for capturing meeting snippets is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

The illustrated embodiments describe a method that includes identifying a trigger event initiated by at least one participant of the meeting. The trigger event is indicative of at least a reference to meeting metadata associated with the meeting. Further, the method includes recording the meeting for a determined duration to generate a plurality of meeting snippets, based on the identification of the trigger event. A meeting summary may be generated based on aggregating the plurality of meeting snippets and the meeting metadata.

Illustrated embodiments describe a central server that includes a memory device configured to store a set of instructions. The central server further includes a processor communicatively coupled to the memory device. The processor configured to execute the set of instructions to identify a trigger event initiated by at least one participant of the meeting, wherein the trigger event is indicative of at least a reference, by the at least one participant, to meeting metadata associated with the meeting. The processor is further configured to record the meeting for a determined duration to generate a plurality of meeting snippets, based on the identification of the trigger event. The processor is further configured to generate a meeting summary, by the processor, based on aggregating the plurality of meeting snippets and the meeting metadata.

Figure 1:
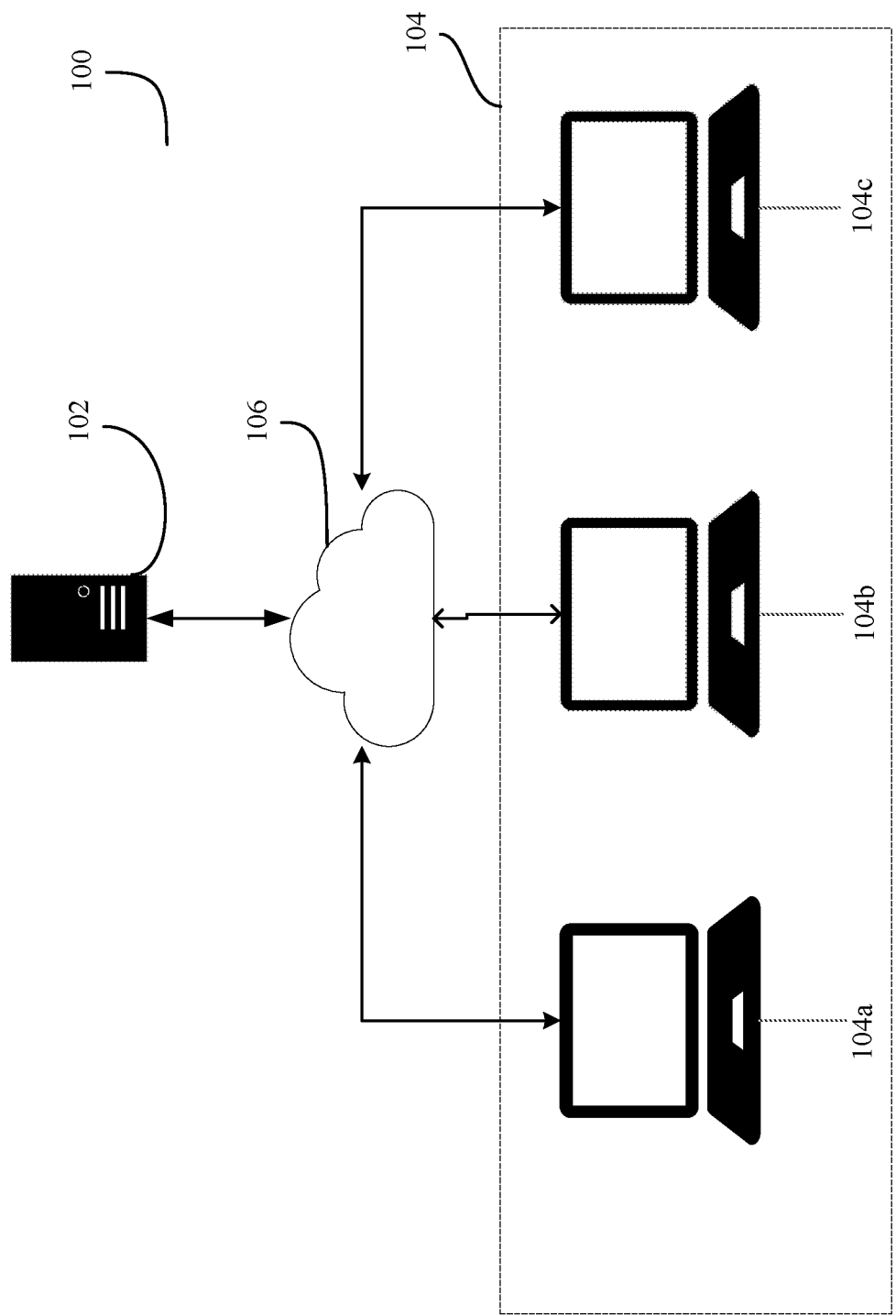
FIG. 1 is a block diagram that illustrates a system environment for capturing meeting snippets, in accordance with an embodiment of the disclosure.

FIG. 1 is a block diagram that illustrates a system environment for capturing meeting snippets, in accordance with an embodiment of the disclosure. Referring to FIG. 1, there is shown a system environment 100, which includes a central server 102, one or more computing devices 104*a*, 104*b*, and 104*c* collectively referenced as computing devices 104, and a communication network 106. The central server 102 and the computing devices 104 may be communicatively coupled with each other through the communication network 106.

The central server 102 may comprise suitable logic, circuitry, interfaces, and/or code that may be configured to create a meeting session through which the computing devices 104 may communicate with each other. For example, through the meeting session, the computing devices 104, may share content (referred to as meeting data) amongst each other. Further, the central server 102 may be configured to monitor the meeting data generated during the meeting. The monitoring of the meeting data may comprise identifying a trigger event during the meeting. Based on the identification of the trigger event, the central server 102 may be configured to capture a plurality of meeting snippets. Additionally, or alternatively, the central server 102 may be configured to aggregate the plurality of meeting snippets to generate a meeting summary. Examples of the central server 102 may include, but are not limited to, a personal computer, a laptop, a personal digital assistant (PDA), a mobile device, a tablet, or any other computing device.

The computing devices 104 may comprise suitable logic, circuitry, interfaces, and/or code that may enable the computing devices 104 to connect to the meeting session, created by the central server 102. In an exemplary embodiment, the computing devices 104 may be associated with the plurality of participants of the meeting. The plurality of participants may provide one or more inputs during the meeting that may cause the computing devices 104 to generate the meeting data during the meeting. In an exemplary embodiment, the meeting data may correspond to the content shared amongst the computing devices 104 during the meeting. In some examples, the meeting data may comprise, but are not limited to, audio content (may be generated by the plurality of participants as the plurality of participants speak during the meeting), video content (may include video feed of the plurality of participants), meeting notes (may be input by the plurality of participants during the meeting), presentation content, screen sharing content, file sharing content and/or any other content shared during the meeting. Additionally, the computing devices 104 may be configured to receive an input, indicative of the trigger event, from respective participants. Upon receiving the input, the computing devices 104 may be configured to transmit the input to the central server 102. Examples of the computing devices 104 may include, but are not limited to, a personal computer, a laptop, a personal digital assistant (PDA), a mobile device, a tablet, or any other computing device.

In an embodiment, the communication network 106 may include a communication medium through which each of the computing devices 104 associated with the plurality of participants may communicate with each other and/or with the central server 102. Such a communication may be performed, in accordance with various wired and wireless communication protocols. Examples of such wired and wireless communication protocols include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, 2G, 3G, 4G, 5G, 6G cellular communication protocols, and/or Bluetooth (BT) communication protocols. The communication network 106 may include, but is not limited to, the Internet, a cloud network, a Wireless Fidelity (Wi-Fi) network, a Wireless Local Area Network (WLAN), a Local Area Network (LAN), a telephone line (POTS), and/or a Metropolitan Area Network (MAN).

In operation, the central server 102 may receive a request, from a computing device 104*a*, to generate the meeting session for a meeting. In an exemplary embodiment, the request may include meeting metadata associated with the meeting that is to be scheduled. In an exemplary embodiment, the meeting metadata may include, but not limited to, an agenda of the meeting, one or more topics to be discussed during the meeting, a time duration of the meeting, a schedule of the meeting, meeting notes carried forward from previous meetings, and/or the like. Upon receiving the request, the central server 102 may create the meeting session. In an exemplary embodiment, the meeting session may correspond to a communication session that allows the computing devices 104 to communicate with each other. The meeting session may share unique keys (public and private keys) with the computing devices 104, which allows the computing devices 104 to communicate with each other. In some examples, the unique keys, corresponding to the meeting session, may ensure that any other computing devices (other than the computing devices 104) are not allowed to join the meeting session. Additionally, or alternatively, the central server 102 may send a notification to the computing devices 104 pertaining to the scheduled meeting. The notification may include the details of the meeting session. For example, the central server 102 may transmit the unique keys and/or the meeting metadata to the computing devices 104.

The computing devices 104 may join the meeting through the meeting session. In an exemplary embodiment, the participants associated with the computing devices 104 may cause the computing devices 104 to join the meeting session. In an exemplary embodiment, joining the meeting session has been interchangeably referred to as joining the meeting. Thereafter, the participants associated with the computing devices 104 may cause the computing devices 104 to share content amongst each other. For example, the participants may speak during the meeting. The computing devices 104 may capture voice of the participants through one or more microphones to generate audio content. Further, the computing devices 104 may transmit the audio content over the communication network 106 (i.e., meeting session). Additionally, or alternatively, the participants may share respective video feeds amongst each other by utilizing image capturing device (e.g., camera) associated with the computing devices 104. Additionally, or alternatively, a participant of the plurality of participants may present content saved on the computing device (for example, the computing device 104*a*) through screen sharing capability. For example, the participant may present content to other participants through power point presentation application installed on the computing device 104*a*. In some examples, the participant may share content through other applications installed on the computing device 104*a*. For example, the participant may share content through word processor application installed on the computing device 104*a*. Additionally or alternatively, the participant may take meeting notes during the meeting. In an exemplary embodiment, the audio content, the video content, the meeting notes, and/or the screen sharing content (e.g., through applications installed on the computing device 104*a*) may constitute the meeting data. Therefore, in some examples, the computing device 104*a* may generate the meeting data during the meeting. Similarly, other computing devices 104*b* and 104*c* may also generate the meeting data during the meeting. Additionally, or alternatively, the computing devices 104 may transmit the meeting data to the central server 102 over the meeting session. In an exemplary embodiment, the computing devices 104 may transmit the meeting data in near real time. To this end, the computing devices 104 may be configured to transmit the meeting data as and when the computing devices 104 generate the meeting data.

In an exemplary embodiment, the central server 102 may receive the meeting data from the computing devices 104.

Thereafter, the central server 102 may compare the meeting data with the meeting metadata to identify a trigger event during the meeting. In an exemplary embodiment, the trigger event may be indicative of a timestamp at which at least one participant discussed to refer to a topic corresponding to the meeting metadata. For example, the at least one participant discussed a topic mentioned in the agenda of the meeting.

In response to the identification of the trigger event, the central server 102 may record the meeting for a determined duration to generate a meeting snippet. Similarly, during the meeting, the central server 102 may be configured to identify multiple trigger events. Accordingly, the central server 102 may be configured to generate multiple meeting snippets. Since the meeting snippet is recorded for the determined duration upon identification of the trigger event, accordingly, the meeting snippet includes the meeting data that caused the central server 102 to identify the trigger event. For example, the meeting data recorded by the central server 102 includes the reference to the trigger event. Accordingly, the meeting snippet includes the portion of the meeting data that is of importance to the plurality of participants of the meeting.

Figure 2:
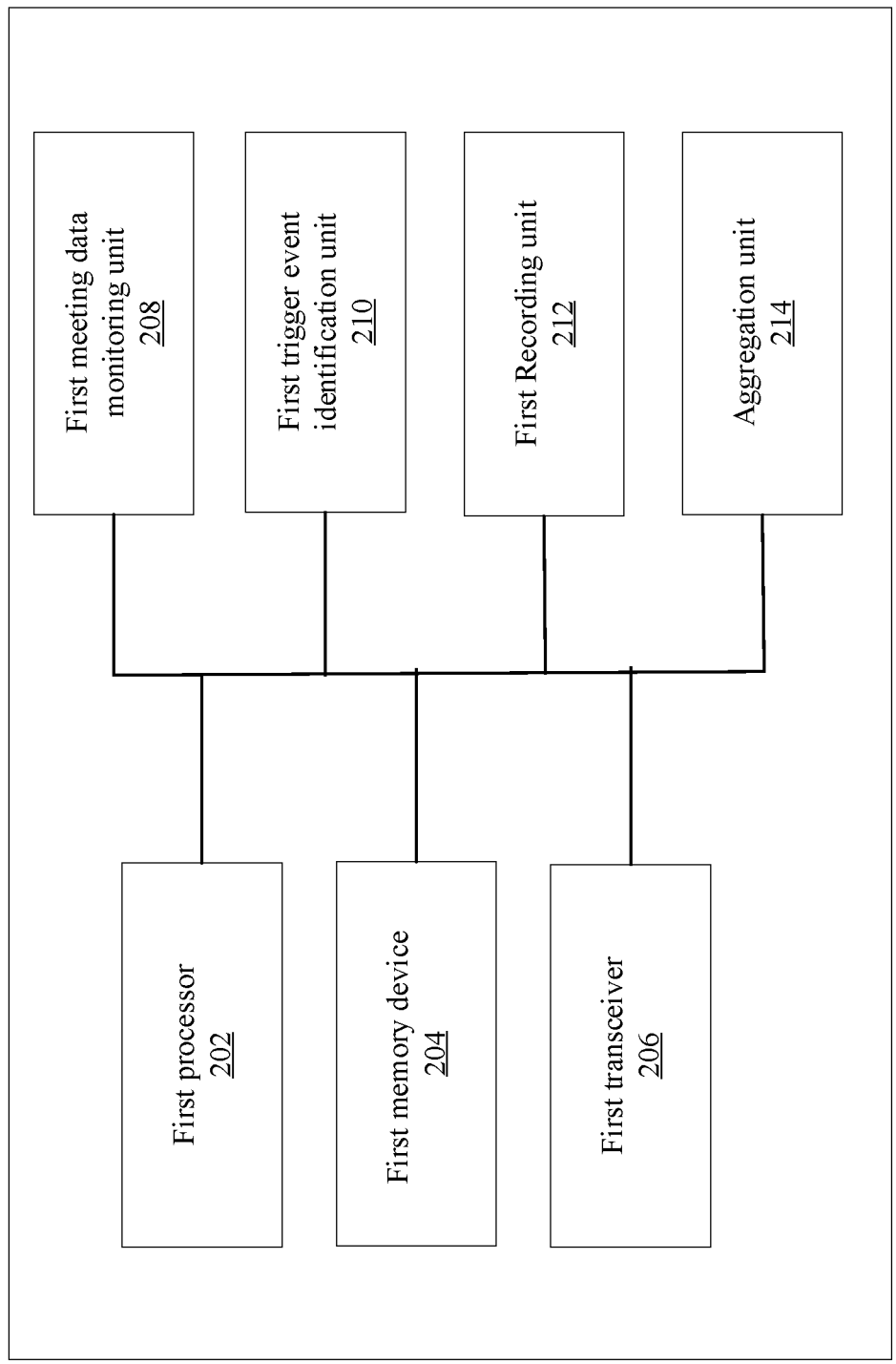
FIG. 2 is a block diagram of a central server for capturing meeting snippets, in accordance with an embodiment of the disclosure.

FIG. 2 is a block diagram of the central server for capturing meeting snippets, in accordance with an embodiment of the disclosure. The central server 102 comprises a first processor 202, a first memory device 204, a first transceiver 206, a first meeting data monitoring unit 208, a first trigger event identification unit 210, a first recording unit 212, and an aggregation unit 214.

The first processor 202 may be embodied as one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application specific integrated circuit (ASIC) or field programmable gate array (FPGA), or some combination thereof.

Accordingly, although illustrated in FIG. 2 as a single controller, in an exemplary embodiment, the first processor 202 may include a plurality of processors and signal processing modules. The plurality of processors may be embodied on a single electronic device or may be distributed across a plurality of electronic devices collectively configured to function as the circuitry of the central server 102. The plurality of processors may be in communication with each other and may be collectively configured to perform one or more functionalities of the circuitry of the central server 102, as described herein. In an exemplary embodiment, the first processor 202 may be configured to execute instructions stored in the first memory device 204 or otherwise accessible to the first processor 202. These instructions, when executed by the first processor 202, may cause the circuitry of the central server 102 to perform one or more of the functionalities, as described herein.

Whether configured by hardware, firmware/software methods, or by a combination thereof, the first processor 202 may include an entity capable of performing operations according to embodiments of the present disclosure while configured accordingly. Thus, for example, when the first processor 202 is embodied as an ASIC, FPGA or the like, the first processor 202 may include specifically configured hardware for conducting one or more operations described herein. Alternatively, as another example, when the first processor 202 is embodied as an executor of instructions, such as may be stored in the first memory device 204, the instructions may specifically configure the first processor 202 to perform one or more algorithms and operations described herein.

Thus, the first processor 202 used herein may refer to a programmable microprocessor, microcomputer or multiple processor chip or chips that may be configured by software instructions (applications) to perform a variety of functions, including the functions of the various embodiments described above. In some devices, multiple processors may be provided that may be dedicated to wireless communication functions and one processor may be dedicated to running other applications. Software applications may be stored in the internal memory before they are accessed and loaded into the processors. The processors may include internal memory sufficient to store the application software instructions. In many devices, the internal memory may be a volatile or nonvolatile memory, such as flash memory, or a mixture of both. The memory can also be located internal to another computing resource (e.g., enabling computer readable instructions to be downloaded over the Internet or another wired or wireless connection).

The first memory device 204 may include suitable logic, circuitry, and/or interfaces that are adapted to store a set of instructions that is executable by the first processor 202 to perform predetermined operations. Some of the commonly known memory implementations include, but are not limited to, a hard disk, random access memory, cache memory, read only memory (ROM), erasable programmable read-only memory (EPROM) & electrically erasable programmable read-only memory (EEPROM), flash memory, magnetic cassettes, magnetic tape, magnetic disk storage or other magnetic storage devices, a compact disc read only memory (CD-ROM), digital versatile disc read only memory (DVD-ROM), an optical disc, circuitry configured to store information, or some combination thereof. In an exemplary embodiment, the first memory device 204 may be integrated with the first processor 202 on a single chip, without departing from the scope of the disclosure.

The first transceiver 206 may correspond to a communication interface that may facilitate transmission and reception of messages and data to and from various devices (e.g., computing devices 104). Examples of the first transceiver 206 may include, but are not limited to, an antenna, an Ethernet port, a USB port, a serial port, or any other port that can be adapted to receive and transmit data. The first transceiver 206 transmits and receives data and/or messages in accordance with the various communication protocols, such as, Bluetooth®, Infrared, I2C, TCP/IP, UDP, and 2G, 3G, 4G or 5G communication protocols.

The first meeting data monitoring unit 208 may comprise suitable logic, circuitry, interfaces, and/or code that may configure the central server 102 to monitor the meeting data received from the computing devices 104. In an exemplary embodiment, the first meeting data monitoring unit 208 may be configured to generate a transcript from the meeting data using one or more known techniques. Some examples of the one or more known techniques may include STT, OCR, and/or the like. Additionally, or alternatively, the first meeting data monitoring unit 208 may be configured to timestamp the transcript in accordance with a time instant at which the central server 102 received the meeting data (from which the transcript was generated). The first meeting data monitoring unit 208 may be implemented using Field Programmable Gate array (FPGA) and/or Application Specific Integrated Circuit (ASIC).

The first trigger event identification unit 210 may comprise suitable logic, circuitry, interfaces, and/or code that may configure the central server 102 to compare the transcript of the meeting data with the meeting metadata. Based on the comparison between the meeting metadata and the transcript of the meeting data, the trigger identification unit 210 may be configured to identify trigger event. As discussed, the trigger event may correspond to a timestamp during the meeting at which at least one participant mentioned or referred to the meeting metadata. In an exemplary embodiment, the first trigger event identification unit 210 may be configured to receive an input from at least one computing device of the computing devices 104. The trigger identification unit 210 may identify the received input as the trigger event. The first trigger event identification unit 210 may be implemented using Field Programmable Gate array (FPGA) and/or Application Specific Integrated Circuit (ASIC).

The first recording unit 212 may comprise suitable logic, circuitry, interfaces, and/or code that may configure the central server 102 to generate a meeting snippet in response to the identification of the trigger event. In an exemplary embodiment, the first recording unit 212 may be configured to record the meeting for a determined duration in order to generate the meeting snippet. The meeting snippet may correspond a recording of a portion of the meeting. Further, the meeting snippet includes a portion of the meeting data received during the determined duration. In an exemplary embodiment, the first recording unit 212 may be configured to record a plurality of meeting snippets during the meeting. The first recording unit 212 may be implemented using Field Programmable Gate array (FPGA) and/or Application Specific Integrated Circuit (ASIC).

The aggregation unit 214 may comprise suitable logic, circuitry, interfaces, and/or code that may configure the central server 102 to aggregate the plurality of meeting snippets to generate the meeting summary. In an exemplary embodiment, the aggregation unit 214 may be configured to aggregate the plurality of meeting snippets in a chronological order of generation of the plurality of meeting snippets. Alternatively, the aggregate unit 214 may aggregate the plurality of meeting snippets based on the meeting metadata. The aggregation unit 214 may be implemented using Field Programmable Gate array (FPGA) and/or Application Specific Integrated Circuit (ASIC).

In operation, the first processor 202 may receive the request to schedule the meeting from at least one computing device 104a of the computing devices 104. In an exemplary embodiment, the request to schedule the meeting includes meeting metadata. As discussed, the meeting metadata includes the agenda of the meeting, the one or more topics to be discussed during the meeting, the time duration of the meeting, the schedule of the meeting, the meeting notes carried from previous meetings, and/or the like. Following table illustrates an example meeting metadata:

TABLE 1

Example meeting metadata

| Agenda | One or more topics | Time duration | Schedule of the meeting | Meeting notes from previous meetings |
|---|---|---|---|---|
| To discuss design of the User interface | 1. Layout 2. Fields to be displayed in UI | 1 hour | 15$^{th}$ Nov., 2020; 9 PM to 10 PM | 1. UI to include feature 1, feature 2 2. Feature 1 |
| (UI) | 3. Current status of project | | | defined as a portion depicting participants 3. Feature 2 depicting chat box |

In an exemplary embodiment, the first processor 202 may be configured to store the meeting metadata in the first memory device 204. Additionally, in response to receiving the request to schedule the meeting, the first processor 202 may be configured to create the meeting session. As discussed, the meeting session corresponds to a communication session that allows the computing devices 104 to connect to the central server 102. Further, the meeting session allows the computing devices 104 to communicate amongst each other. For example, over the meeting session, the computing devices 104 may share content (e.g., audio content and/or video content) amongst each other. In an exemplary embodiment, the first processor 202 may be configured to transmit a message to each of the computing devices 104 comprising the details of the meeting session. For example, the message may include a link to the connect to the meeting session.

At the scheduled time, the plurality of participants may cause the respective computing devices 104 to join the meeting session. For example, the participant may click on the link (received in the message from the central server 102) to cause the computing devices 104 to join the meeting session. In response to the computing devices 104 joining the meeting session, the central server 102 may transmit a User Interface (UI) to each of the computing devices 104. In an exemplary embodiment, the UI may allow the plurality of participants to access to one or more features. For example, the UI may allow the plurality of participants to share audio content and/or video content. To this end, the UI may provide control to the plurality of participants to enable/disable an image capturing device and/or an audio capturing device in the computing devices 104. Additionally, or alternatively, the UI may enable the plurality of participants to share other content. For example, the UI may provide a feature to the plurality of participants that would allow to the plurality of participants to cause the computing devices 104 to share content/applications being displayed on a display device associated with the computing devices 104. For instance, through the UI, the plurality of participants may cause the computing devices 104 to share a power point presentation being displayed on the computing devices 104. Additionally, or alternatively, the UI may present a "notes" feature to the plurality of participants on respective computing devices 104. The notes feature may enable the plurality of participants to input notes or keep track of important points discussed during the meeting.

Accordingly, the plurality of participants may utilize the one or more features presented on the UI to interact and/or share content with amongst each other. Accordingly, each of the computing devices 104 may generate meeting data during the meeting. As discussed, the meeting data may include, but not limited to, the audio content (may generated by the plurality of participants as the plurality of participants speak during the meeting), the video content (may include video feed of the plurality of participants), the meeting notes (may be input by the plurality of participants during the meeting), the presentation content, the screen sharing content, the file sharing content and/or any other content shared during the meeting. To this end, in an exemplary embodiment, the first processor 202 may receive the meeting data from each of the computing devices 104 in real time.

In an exemplary embodiment, the first meeting data monitoring unit 208 may be configured to generate, in real time, a transcript based on the meeting data. For example, the first meeting data monitoring unit 208 may be configured to convert the audio content (received from computing devices 104) to text using known Speech to Text (STT) techniques. The text (obtained from the audio content) may constitute the transcript. In another example, the first meeting data monitoring unit 208 may be configured to generate the transcript from the video content. For instance, the first meeting data monitoring unit 208 may perform optical character recognition (OCR) on the video content to generate the transcript. In yet another example, the first meeting data monitoring unit 208 may be configured to consider the meeting notes (input by the participants) as the transcript. In yet another example, the first meeting data monitoring unit 208 may be configured to perform OCR on the content shared via the screen sharing feature to generate the transcript. Additionally, or alternatively, the first meeting data monitoring unit 208 may be configured to timestamp the meeting transcript in accordance with a time instant of the reception of the meeting data. For example, the first processor 202 receives the meeting data at time instant $T_1$. To this end, the first meeting data monitoring unit 208 may generate the transcript from the meeting data (received at the time instant $T_1$) and may timestamp the transcript with time instant $T_1$. An example of the transcript is further illustrated and described in FIG. 3. During the meeting, the meeting data monitoring unit 208 may be configured to generate multiple transcripts based on the meeting data received during the meeting. Accordingly, during the meeting, the meeting data monitoring unit 208 may be configured to consolidate the multiple transcripts to generate a meeting transcript.

Figure 3:
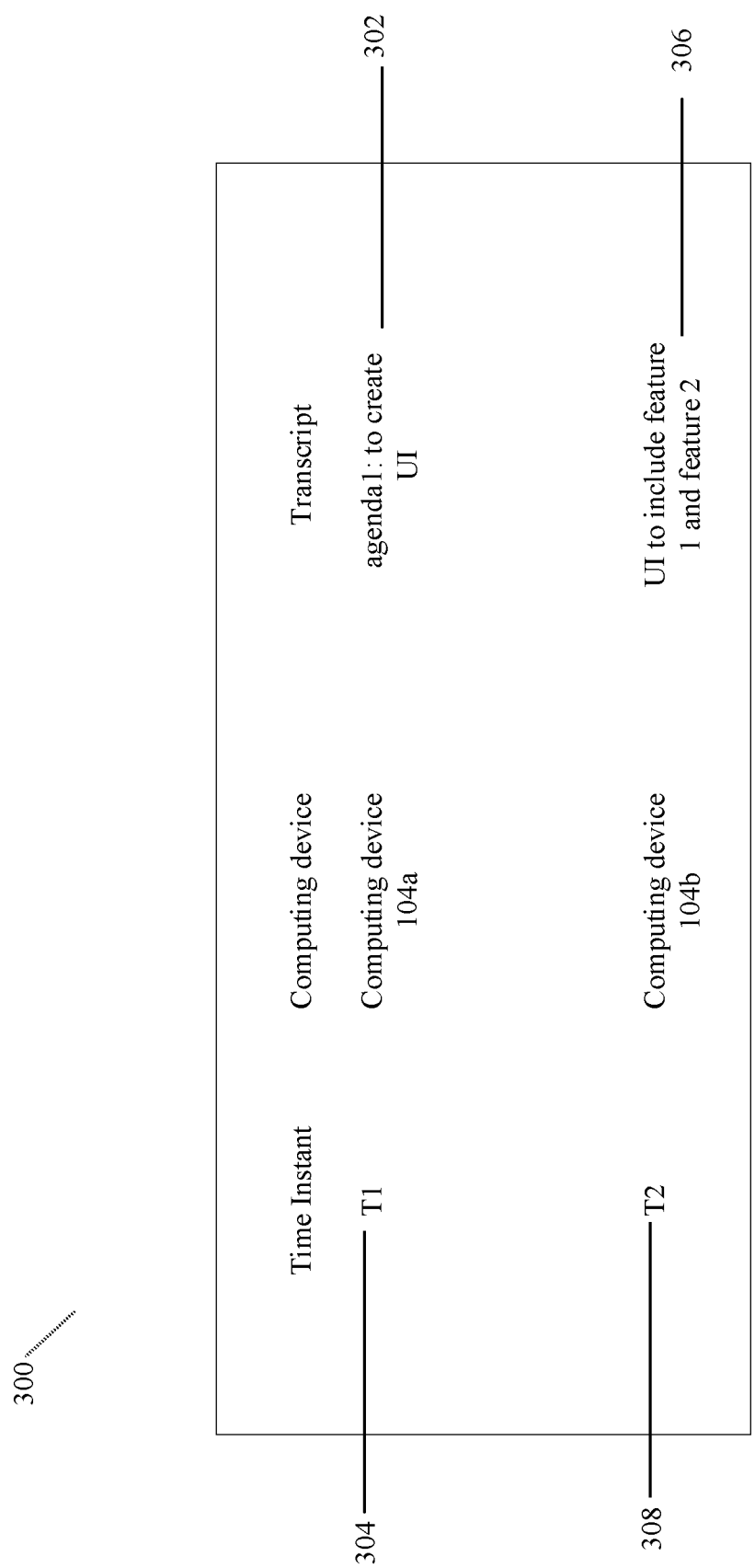
FIG. 3 is a diagram that illustrates an example meeting transcript, in accordance with an embodiment of the disclosure.

FIG. 3 is a diagram that illustrates an example meeting transcript, in accordance with an embodiment of the disclosure. The example meeting transcript 300 includes a transcript "agenda1: to create UI" (depicted by 302) received at the time instant $T_1$ (depicted by 304) from the computing device 104a. Similarly, the meeting transcript 300 includes another transcript "UI to include feature 1 and feature 2" (depicted by 306) received at the time instant $T_2$ (depicted by 308) from the computing device 104b In some examples, the first meeting data monitoring unit 208 may be configured to merge multiple transcripts, generated from the meeting data received from each of the computing devices 104, based on the timestamp associated with the multiple transcripts. For example, first meeting data monitoring unit 208 generates a transcript $M_1$ (from meeting data received from computing device 104a at timestamp $T_1$) and a transcript $M_2$ (from meeting data received from computing device 104b at timestamp $T_1$). In such an embodiment, the first meeting data monitoring unit 208 may be configured to merge the transcript $M_1$ and the transcript $M_2$ based on the timestamp $T_1$. To this end, the meeting transcript may include the transcript $M_1$ and transcript $M_2$ such that the transcripts $M_1$ and $M_2$ are associated with the same timestamp (i.e., $T_1$).

Concurrently, in an exemplary embodiment, the first trigger event identification unit 210 may be configured to compare the meeting metadata and the meeting transcript. In an exemplary embodiment, the first trigger event identification unit 210 may compare the transcript at each timestamp (in the meeting transcript) with the meeting metadata using one or more known text comparison techniques. Some examples of the text comparison techniques may include, but not limited to, Cosine Similarity, Euclidean distance, Pearson coefficient and/or the like. In order to utilize the text comparison techniques, the first trigger event identification unit 210 may be configured to convert the transcript at each timestamp into a transcript vector. In an exemplary embodiment, the transcript vector using one or more known transformation techniques such as, but not limited to, term frequency-inverse document frequency (TF-IDF), Wor2Vec, and/or the like. In an exemplary embodiment, the transcript vector may correspond to an array of integers, in which each integer corresponds to a term in the transcript. Further, the value of the integer may be deterministic of the characteristic of the term within the transcript. For example, the integer may be deterministic of a count of times a term has appeared in the transcript. Similarly, the first trigger event identification unit 210 may be configured to convert the meeting metadata to metadata vector. Thereafter, the first trigger event identification unit 210 may utilize the one or more text comparison techniques to compare the metadata vector and the transcript vector and determine a similarity score between the metadata vector and the transcript vector. For example, the first trigger event identification unit 210 may determine a Cosine similarity score between the metadata vector and the transcript vector.

In some embodiments, the first trigger event identification unit 210 may be configured to determine whether the similarity score is greater than or equal to a similarity score threshold. If the first trigger event identification unit 210 determines that similarity score is less than the similarity score threshold, the first trigger event identification unit 210 may be configured to determine that the transcript is dissimilar from the meeting metadata. However, if the first trigger event identification unit 210 determines that similarity score is greater than or equal to the similarity score threshold, the first trigger event identification unit 210 may be configured to determine that the transcript is similar to the meeting metadata. Accordingly, the first trigger event identification unit 210 may determine that one of plurality of participants mentioned or presented content related to the meeting metadata. To this end, the first trigger event identification unit 210 may identify a trigger event.

In some embodiments, the scope of the disclosure is not limited to the first trigger event identification unit 210 identifying the trigger event based on the comparison between the meeting data and the meeting metadata. In an exemplary embodiment, the first trigger event identification unit 210 may be configured to receive an input from a computing device (e.g., 104a) of the computing devices 104. The input may indicate that a participant may want to record the portion of the meeting for later reference. For example, during the meeting, the participant may find the discussion and/or the content being presented, interesting. Accordingly, in some examples, the participant may provide an input on the UI to record the portion of the meeting that includes the discussion that the participant found interesting. In such an embodiment, the computing device 104a may transmit the input (received from the participant through UI) to the central server 102. Upon receiving the input from the computing device 104a, the first trigger event identification unit 210 may identify the input as the trigger event.

Additionally, or alternatively, the first processor 202 may be configured to categorize each of the transcripts in one or more categories. In an exemplary embodiment, the one or more categories may include an action category, a schedule category, work status category, and/or the like. In an exemplary embodiment, the action category may correspond to a category that may comprise transcripts which are indicative of an action item for the plurality of participants. In an exemplary embodiment, the schedule category may correspond to a category that may comprise transcripts indicative of schedule of a subsequent meeting. In yet another embodiment, the work status category may correspond to a category that may include transcripts indicative of status of task or a work product.

In an exemplary embodiment, the first processor 202 may be configured to utilize a classifier to categorize the transcripts in the one or more categories. In some examples, the classifier may correspond to a machine learning (ML) model that is capable of categorizing the transcripts based on the semantics of the transcripts. For example, the ML model may be capable of transforming the transcript into the transcript vector. Thereafter, the ML model may be configured to utilize the known classification techniques to classify the transcripts in the one or more categories. Some examples of the classification techniques may include, but not limited to, Naive Bayes classification technique, logistic regression, hierarchal classifier, random forest classifier, and/or the like. In some examples, prior to utilizing the classifier to classify the transcripts in the one or more categories, the first processor 202 may be configured to train the classifier based on a training data. The training data may include one or more features and one or more labels. The one or more features may include training transcripts, while the one or more labels may include the one or more categories. In the training data, each of the transcripts is associated with a category of the one or more categories. Training the classifier may include the first processor 202 defining a mathematical relationship between the transcript vectors and the one or more categories. Thereafter, the first processor 202 utilizes the classifier to classify the transcript to the one or more categories.

In some examples, the first trigger event identification unit 210 may be configured to identify the trigger event based on the classification of the transcript in the one or more categories. Additionally, or alternatively, the first trigger event identification unit 210 may be configured to identify the trigger event based on the categorization of the transcript in the one or more categories and the reception of the input from the computing device (e.g., 104a). Additionally, or alternatively, the first trigger event identification unit 210 may be configured to identify the trigger event based on the categorization of the transcript in the one or more categories and the similarity score. Additionally, or alternatively, the first trigger event identification unit 210 may be configured to identify the trigger event based on the similarity score and the reception of the input from the computing device (e.g., 104a). Additionally or alternatively, the first trigger event identification unit 210 may be configured to identify the trigger event based on the categorization of the transcript in the one or more categories, reception of the input from the computing device (e.g., 104a), and the similarity score.

In some examples, the first trigger event identification unit 210 may receive multiple inputs from multiple computing devices 104 at the same time instant. Additionally or alternatively, the first trigger identification unit 210 may be configured to receive the multiple inputs from the multiple computing devices 104 within a predetermined time period of the time instant (at which the first trigger event identification unit 210 received the input from the computing device 104a). For example, the first trigger event identification unit 210 receives the input from the computing device 104a at the time instant $T_1$ and the first trigger event identification unit 210 receives another input from the computing device 104b at the time instant $T_2$. Time instant $T_2$ is within the predetermined time period of the time instant $T_1$. In such an embodiment, the first trigger event identification unit 210 may be configured to identify the trigger event based on the chronologically earlier input (i.e., the input received at the time instant $T_1$). Further, the first trigger event identification unit 210 may consider the later input as a feedback input on the trigger event. The purpose of the feedback input is described later.

In an exemplary embodiment, based on the identification of the trigger event, the first recording unit 212 may be configured to record the meeting for the determined duration. In an exemplary embodiment, a length of the determined duration may be defined during configuration of the central server 102. Further, the determined duration may be defined based on the timestamp associated with the transcript corresponding to the trigger event (i.e., the transcript that is similar to the meeting metadata). In an alternate embodiment, the determined duration may be defined based on the timestamp of the reception of the input from the computing device 104a. In an exemplary embodiment, the determined duration is defined to include a first determined duration chronologically prior to the timestamp and a second determined duration chronologically after the timestamp. In some examples, a length of the first determined duration is same as a length of the second determined duration. In another example, the length of the first determined duration is different from the length of the second determined duration. For instance, the length of the first determined duration is greater than the length of the second determined duration. In another instance, the length of the second determined duration is greater than the length of the first determined duration.

In view of the foregoing, the first recording unit 212 may be configured to contiguously record the meeting for first determined duration prior to the timestamp and for the second determined duration after the timestamp. In an exemplary embodiment, recording the meeting includes recording the meeting data received by the central server 102 from each of the computing devices 104 during the determined duration. Accordingly, the recording of the meeting includes, recording the audio content, the video content, the screen sharing content, the meeting notes, the presentation content and/or the like, received during the determined duration. In some examples, the recorded meeting corresponds to the meeting snippet.

In some examples, the first recording unit 212 may be configured to record the meeting for the determined duration after the timestamp. In another example, the first recording unit 212 may be configured to record the meeting for the determined duration prior to the timestamp.

In an exemplary embodiment, using the methodology described herein, the first recording unit 212 may be configured to record a plurality of meeting snippets during the meeting. Thereafter, the aggregation unit 214 may be configured to aggregate the plurality of meeting snippets to create a meeting summary. In an exemplary embodiment, the aggregation unit 214 may be configured to aggregate the plurality of meeting snippets in a chronological order based on the timestamp associated with the corresponding transcripts. As discussed, the timestamp associated with a transcript corresponds to the time instant at which the meeting data monitoring unit 208 received the corresponding meeting data. For example, timestamp associated with a first meeting snippet is $T_1$ and the timestamp associated with a second meeting snippet is $T_2$, where $T_2$ is chronologically later than the time instant $T_1$. To this end, the aggregation unit 214 may be configured to aggregate the first meeting snippet and the second meeting snippet such that the first meeting snippet precedes the second meeting snippet in the meeting summary.

In an alternative embodiment, the aggregation unit 214 may be configured to aggregate the plurality of the meeting snippets based on the meeting metadata. For example, the aggregation unit 214 may be configured to aggregate the plurality of meeting snippets in accordance with an order of the one or more topics mentioned in the meeting metadata. For example, referring to Table 1, the first topic mentioned in the one or more topics is "layout" followed by "Field to be displayed in UI". Further, to this end, the first meeting snippet has higher similarity score with the second topic, while the second meeting snippet has higher similarity score with the first topic. Accordingly, the aggregation unit 214 may be configured to aggregate the first meeting snippet and the second meeting snippet such that in the meeting summary, the second meeting snippet precedes the first meeting snippet.

After the generation of the meeting summary, the first processor 202 may be configured to share the meeting summary with the plurality of participants of the meeting. In another example, the first processor 202 may be configured to share the meeting summary with users other than the plurality of participants of the meeting. In some examples, the other user may include other employees of the organization. Sharing the meeting summary may include sharing a link to the meeting summary, where the plurality of participants and/or the other users may access the meeting summary by clicking on the link. In another example, the first processor 202 may be configured to share the meeting summary on a social network such as, but not limited to, Yammer®, Facebook®, Twitter®, and/or the like. In some examples, the first processor 202 may be configured to receive feedback input on the meeting summary from the plurality of participants and/or other users. Some examples of the feedback input may include, but not limited to, receiving a comment on the meeting summary, receiving a "like" or "dislike" on the meeting summary, and/or the like. In some examples, the scope of the disclosure is not limited to receiving the feedback input on the complete meeting summary. In an exemplary embodiment, the first processor 202 may be configured to receive the feedback input on individual meeting snippets that constitute the meeting summary.

Additionally, or alternatively, the first processor 202 may be configured to share the plurality of meeting snippets individually with the plurality of participants. In some embodiments, the first processor 202 may be configured to share the plurality of meeting snippets on the social network. In yet another embodiment, the first processor 202 may be configured to share the plurality of meeting snippets with other users. Further, in an exemplary embodiment, the first processor 202 may be configured to receive the feedback on the plurality of meeting snippets that constitute the meeting summary.

In some examples, the scope of the disclosure is not limited to capturing the plurality of snippets during the meeting. In an exemplary embodiment, the first processor 202 may be configured to capture the plurality of meeting snippets of one or more non-real time meeting data shared amongst the plurality of participants. The one or more non-real time meeting data may include meeting data that is shared amongst the plurality of participants outside the meeting. For example, the one or more non-real time meeting data may include text messages shared amongst the plurality of participants, or the one or more audio messages shared amongst the plurality of participants. In some examples, first processor 202 may be configured to record the plurality of meeting snippets of the one or more non-real time meeting data using similar methodology, as is described above.

Figure 4:
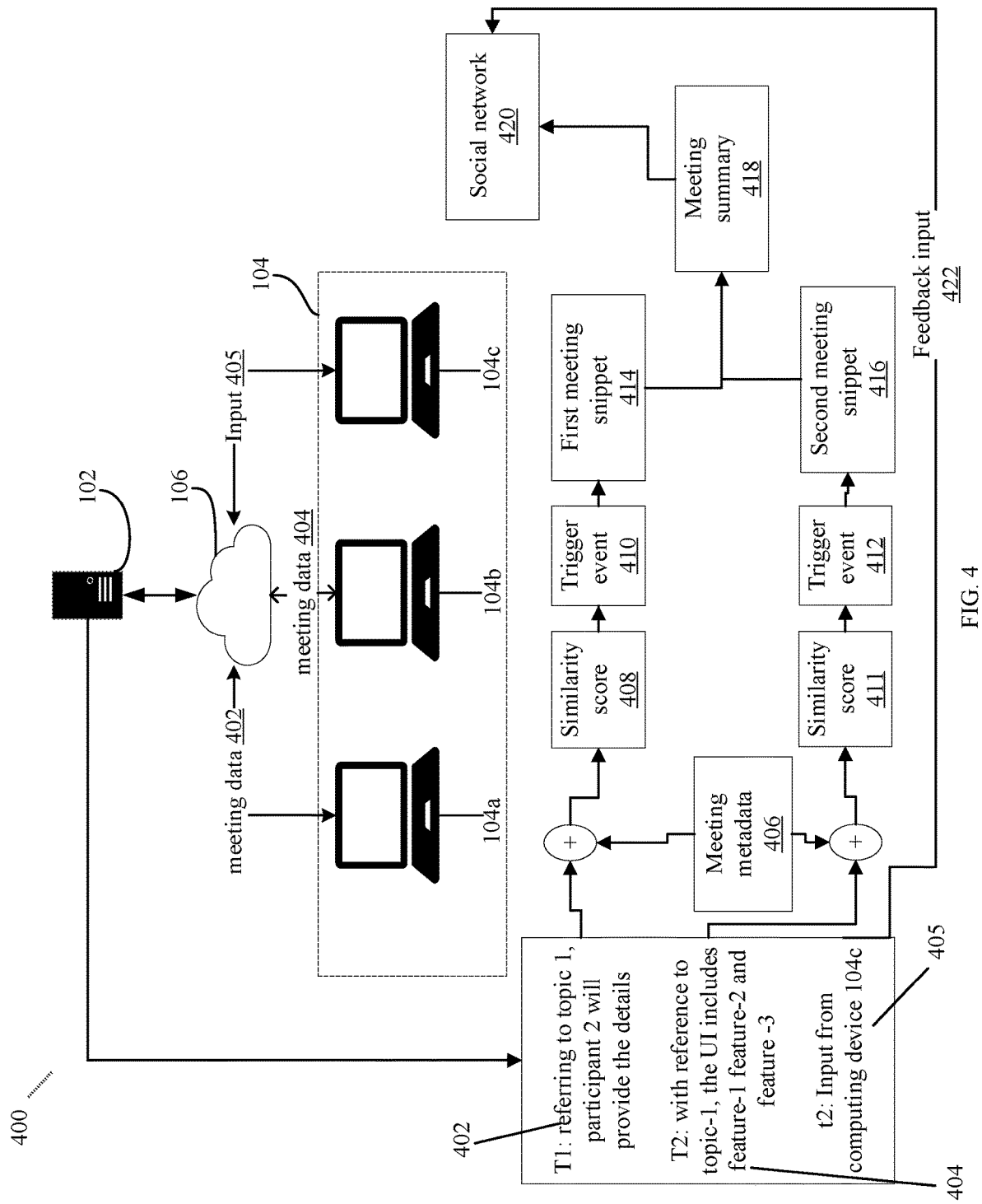
FIG. 4 a diagram that illustrates an exemplary scenario of the meeting, in accordance with an embodiment of the disclosure.

FIG. 4 is a diagram that illustrates an exemplary scenario of the meeting, in accordance with an embodiment of the disclosure.

The exemplary scenario 400 illustrates the computing devices 104 generate the meeting data. Additionally, or alternatively, the computing devices 104 transmit the meeting data to the central server 102. It can be observed that the meeting data 402 transmitted by the computing device 104a comprises text corresponding to the audio content (spoken by the participant-1 associated with the computing device 104a). The text states "referring to topic 1, participant 2 will provide the details". Further, the timestamp associated with the meeting data (transmitted by the computing device 104a) is $T_1$. At time instant $T_2$, the computing device 104b generates the meeting data 404 that includes text obtained from presentation content (by performing OCR). The text may state "with reference to topic-1, the UI includes feature-1, feature-2, and feature-3". Further, at time instant $T_2$, the exemplary scenario 400 illustrates that the computing device 104c transmits an input 405 to the central server 102.

In an exemplary embodiment, in response to receiving the meeting data 402 from the computing device 104a, the central server 102 may be configured to compare the meeting data 402 with the meeting metadata 406 to determine a similarity score between the meeting metadata and the meeting data. Referring to Table 1, since the meeting metadata 406 includes topic-1 and participant-1 refers to topic-1 during the meeting (as is included in the meeting data 402 received from the computing device 104a), therefore, the similarity score 408 between the meeting data 402 (received from the computing device 104a) and the topic-1 is greater than or equal to the similarity score threshold. To this end, the first trigger event identification unit 210 identifies the first trigger event 410.

Similarly, at time instant $T_2$, the first trigger event identification unit 210 may identify a second trigger event 412, as the participant-2 of the meeting presented content related to the topic-1. In an exemplary embodiment, the first trigger event identification unit 210 determines the second trigger event based on the similarity score between the meeting data 404 (received from the computing device 104b) and the meeting metadata. More particularly, the first trigger event identification unit 210 determines that the similarity score 411 between the topic-1 (refer Table 1) and the meeting data 404 is greater than the similarity score threshold. To this end, the first trigger event identification unit 210 identifies the second trigger event 412. Additionally, at the time instant $T_2$, the first trigger event identification unit 210 identifies the second trigger event 412 based on the reception of the input 405.

The first recording unit 212 (in central server 102) records the meeting for a determined duration to generate the first meeting snippet 414, in response to the identification of the first trigger event 410. The first recording unit 212 records the meeting for the first determined duration prior to time instant $T_1$ and for the second determined duration after the time instant $T_1$.

Figure 5:
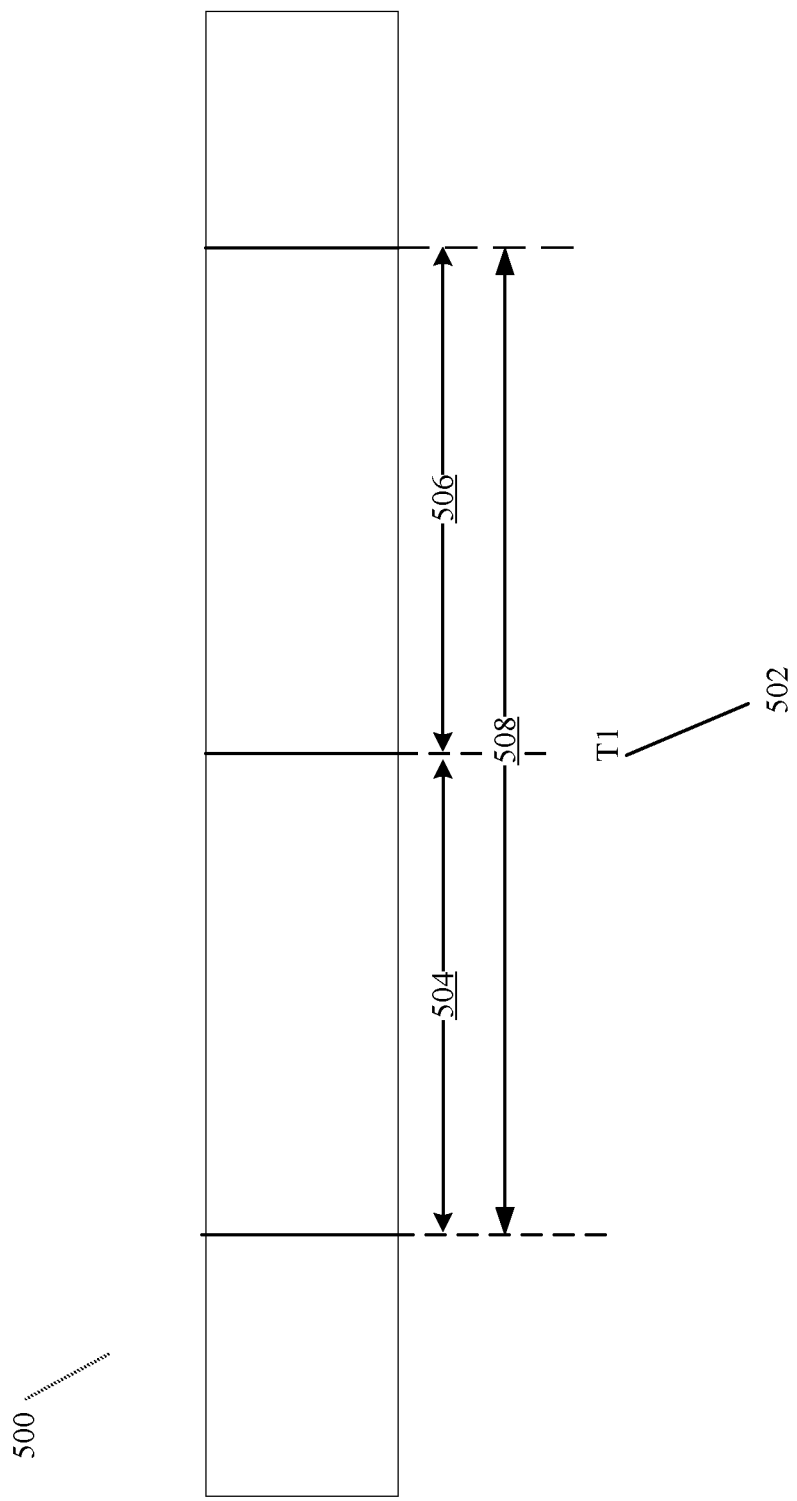
FIG. 5 a diagram that illustrates a timeline for recording of a first meeting snippet, in accordance with an embodiment of the disclosure.

FIG. 5 is a diagram that illustrates a timeline for recording of a first meeting snippet, in accordance with an embodiment of the disclosure. The timeline 500 includes the time instant $T_1$ (502), the first predetermined time duration 504 and the second predetermined time duration 506. Further timeline 500 illustrates that the first determined duration 504 defined to precede time instant $T_1$ (502) and the second determined duration 506 is defined after the time instant $T_1$ (502). The first predetermined time duration 504 and the second predetermined time duration 506 constitute the determined duration 508. As discussed, the first recording unit 212 records the meeting for the determined duration 508.

Referring back to FIG. 4, the first recording unit 212 records the second meeting snippet 416, in response to identification of the second trigger event 412. Further, as illustrated in exemplary scenario 400, the aggregation unit 214 aggregates the first meeting snippet 414 and the second meeting snippet 416 to create the meeting summary 418. In an exemplary embodiment, the aggregation unit 214 aggregates the first meeting snippet 414 and the second meeting snippet 416 according to chronological occurrence of time instant $T_1$ and $T_2$.

Additionally, as illustrated in exemplary scenario 400, the first processor 202 shares the meeting summary 418 on a social network 420. Additionally, the first processor 202 may be configured to add a feedback input 422 to the meeting summary 418. For example, since the first trigger event identification unit 210 receives the input from the computing device 104c at the second time instant $T_2$ and detects the second trigger event 412 at the second time instant $T_2$, the first processor 202 may be configured to add the 422 feedback to the meeting summary 418 on the social network 420. More particularly, the first processor 202 adds the feedback 422 to the second meeting snippet 416 in the meeting summary 418. Further, the first processor 202 adds information pertaining to the participant associated with the feedback 422. Since the participant associated with the computing device 104c provided the input at the second time instant $T_2$, accordingly, the first processor 202 associates participant with the feedback input 422.

Figure 6:
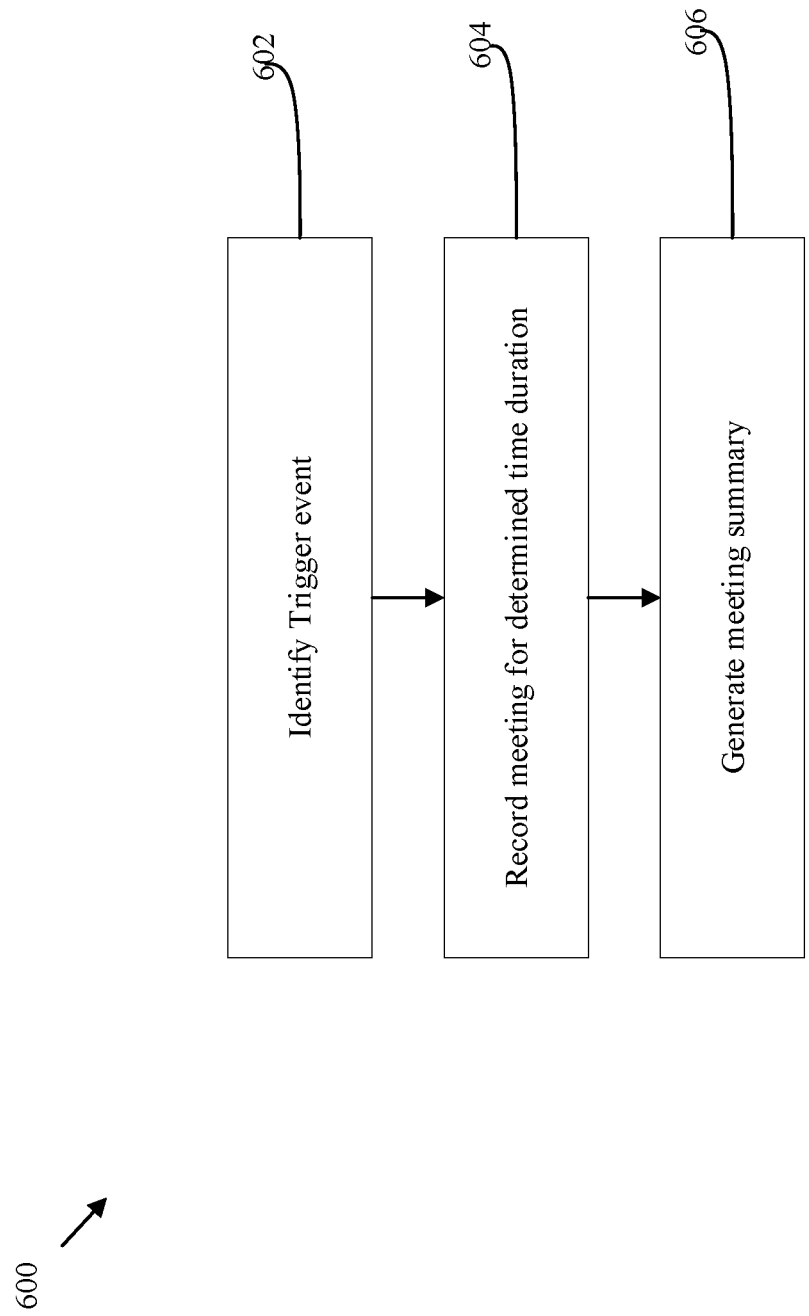
FIG. 6 is a flowchart illustrating a method for operating central server for capturing meeting snippets, in accordance with an embodiment of the disclosure.

FIG. 6 is a flowchart illustrating a method for operating a central server for capturing meeting snippets, in accordance with an embodiment of the disclosure.

At 602, a trigger event is identified. In an exemplary embodiment, the first trigger event identification unit 210 is configured to identify the trigger event based on the comparison between the meeting metadata and the meeting data, received from the computing devices 104. At 604, the meeting is recorded for a determined duration based on the identification of the trigger event. In an exemplary embodiment, the first recording unit 212 may be configured to record the meeting for the determined duration. In some examples, during the course of the meeting, the first recording unit 212 is configured to record the plurality of meeting snippets. At 606, meeting summary is generated. In an exemplary embodiment, the aggregation unit 214 may be configured to aggregate the plurality of meeting snippets to generate the meeting summary.

Figure 7:
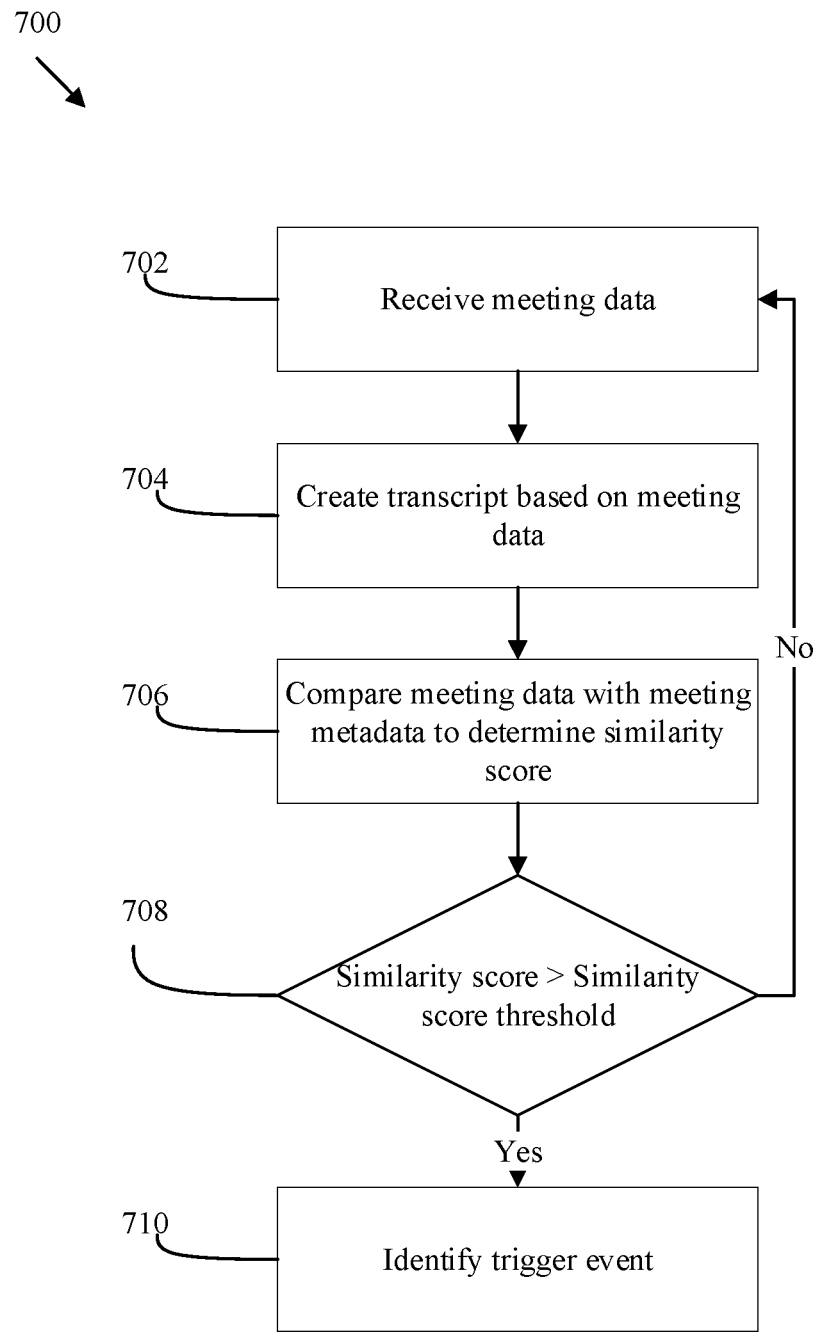
FIG. 7 is a flowchart illustrating a method for identifying a trigger event, in accordance with an embodiment of the disclosure.

FIG. 7 is a flowchart illustrating a method for identifying the trigger event, in accordance with an embodiment of the disclosure.

At 702, the meeting data is received from the computing devices 104. In an exemplary embodiment, the first processor 202 may be configured to receive the meeting data from the computing devices 104 during the meeting. At 704, the transcript is created based on the meeting data. In an exemplary embodiment, the first meeting data monitoring unit 208 may be configured to transform the meeting data to the transcript. At 706, the meeting data is compared with the meeting metadata to determine a similarity score between the meeting metadata and the transcript. In an exemplary embodiment, the first trigger event identification unit 210 may be configured to compare the meeting metadata with the transcript. At 708, the similarity score is compared with the similarity score threshold to determine whether the similarity score is greater than or equal to the similarity score threshold. In an exemplary embodiment, the first trigger event identification unit 210 may be configured to compare the similarity score with the similarity score threshold. If the first trigger event identification unit 210 determines that the similarity score is greater than or equal to the similarity score threshold, the first trigger event identification unit 210 may be configured to perform 710. However, if the first trigger event identification unit 210 determines that the similarity score is less than the similarity score threshold, the first trigger event identification unit 210 may be configured to repeat 702. At 710, the trigger event is identified. In an exemplary embodiment, the first trigger event identification unit 210 identifies the trigger event.

Figure 8:
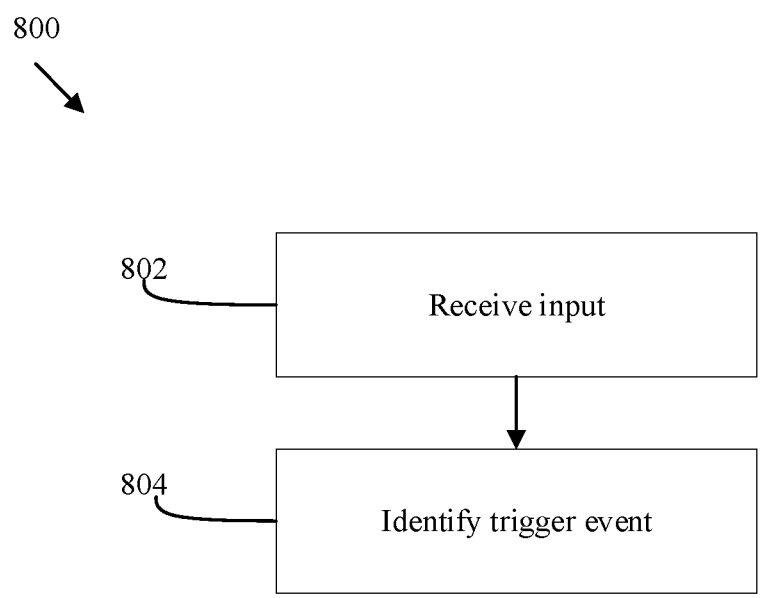
FIG. 8 is a flowchart illustrating another method identifying the trigger event, in accordance with an embodiment of the disclosure.

FIG. 8 is a flowchart illustrating another method identifying the trigger event, in accordance with an embodiment of the disclosure.

At 802, the input is received from a computing device (e.g., 104a) of the computing devices 104. In an exemplary embodiment, the first processor 202 may be configured to receive the input. At 804, identifying the trigger event based on the received input. In an exemplary embodiment, the first trigger event identification unit 210 may be configured to identify the trigger event based on the received input.

Figure 9:
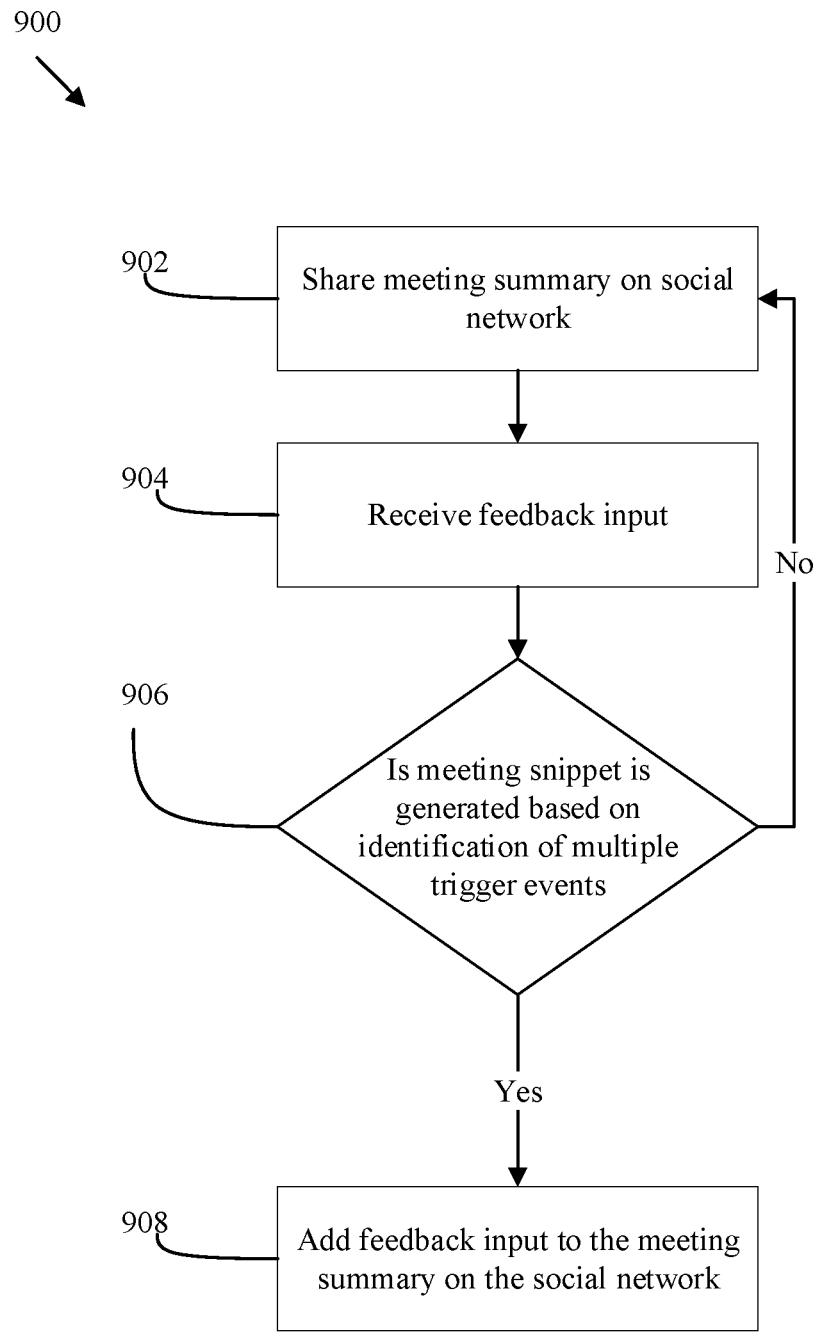
FIG. 9 is a flowchart illustrating a method for sharing a meeting summary, in accordance with an embodiment of the disclosure.

FIG. 9 is a flowchart illustrating a method for sharing the meeting summary, in accordance with an embodiment of the disclosure.

At 902, the meeting summary is shared on the social network. In an exemplary embodiment, the first processor 202 may be configured to share the meeting summary on the social network. At 904, feedback input is received from one or more users on the meeting summary. In an exemplary embodiment, the first processor 202 may be configured to receive the feedback input. Additionally or alternatively, at 906, to check if a meeting snippet of the plurality of meeting snippets (constituting the meeting summary) is generated based on the first trigger event identification unit 210 identifying more than one trigger event at a time instant. In an exemplary embodiment, the first processor 202 may be configured to perform the check. If the first processor 202 determines that the meeting snippet is generated based on the identification of the more than one trigger event, the first processor 202 is configured to perform 908. However, if the first processor 202 determines that the meeting snippet is generated based on identification of a single trigger event, the first processor 202 may be configured to repeat 902. At 908, the feedback input is added to meeting summary on the social network. In an exemplary embodiment, the first processor 202 may be configured to add feedback input to the meeting summary on the social network. In an exemplary embodiment, a count of feedback inputs added to the meeting summary on the social network is based on a count of trigger events identified by the first trigger event identification unit 210 at the time instant of identification of the trigger event. For example, the count of trigger events identified by the first trigger event identification unit 210 at a time instant is 3, the first processor 202 may be configured to add two feedbacks on the meeting summary. For example, the first processor 202 may be configured to add two likes on the meeting summary on the social network.

In some examples, the scope of the disclosure is not limited to the central server 102 performing the aforementioned steps. In an exemplary embodiment, the computing devices 104 may be configured to perform the aforementioned operations without departing from the scope of the disclosure. Such embodiment is further illustrated in FIG. 10.

Figure 10:
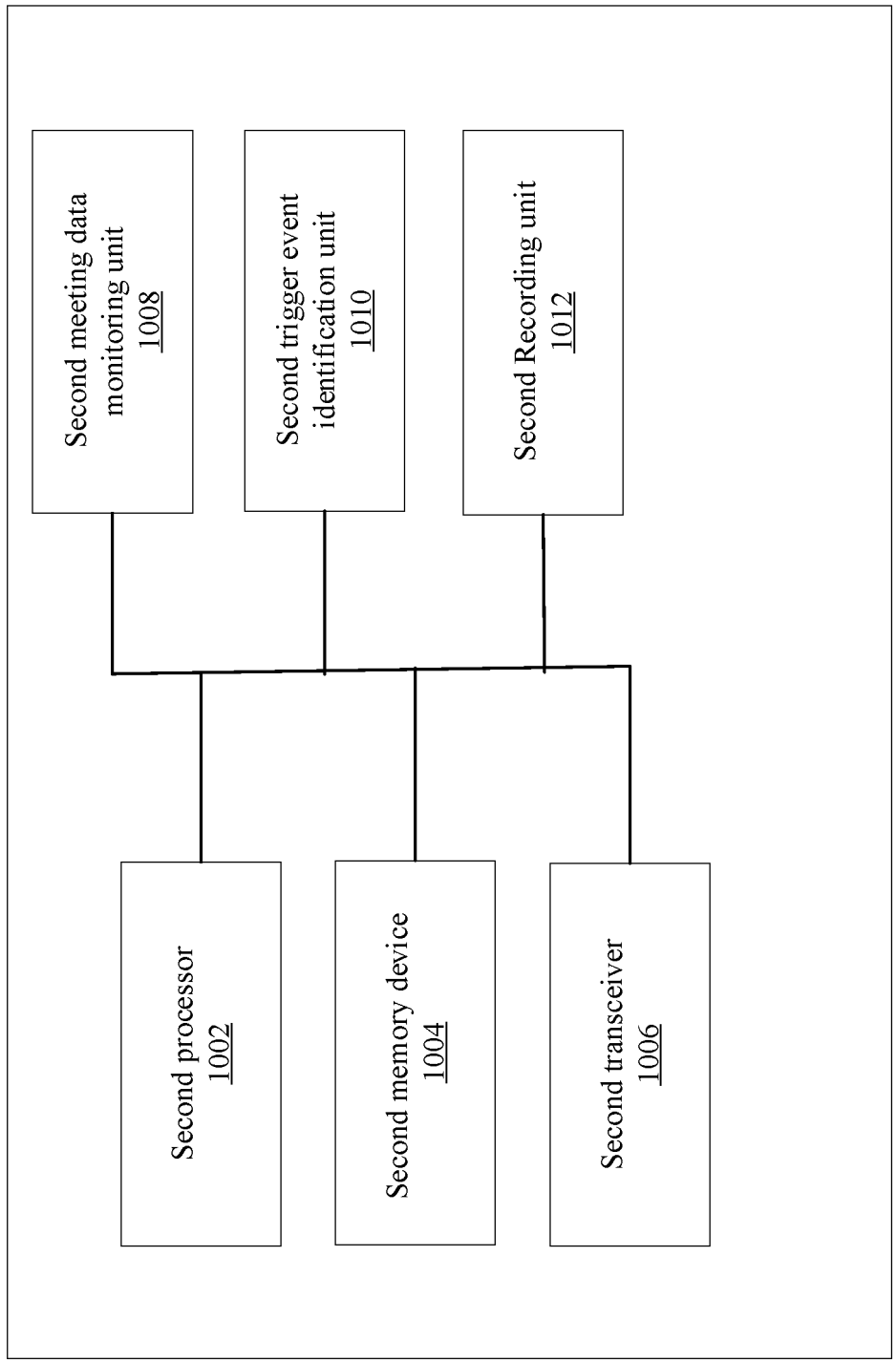
FIG. 10 is a block diagram that illustrates a computing device for capturing meeting snippets, in accordance with an embodiment of the disclosure.

FIG. 10 is a block diagram that illustrates the computing device for capturing meeting snippets, in accordance with an embodiment of the disclosure. The computing device 104a includes a second processor 1002, a second memory device 1004, a second transceiver 1006, a second meeting data monitoring unit 1008, a second trigger event identification unit 1010, and a second recording unit 1012.

The second processor 1002 may be embodied as one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application specific integrated circuit (ASIC) or field programmable gate array (FPGA), or some combination thereof.

Accordingly, although illustrated in FIG. 10 as a single controller, in an exemplary embodiment, the second processor 1002 may include a plurality of processors and signal processing modules. The plurality of processors may be embodied on a single electronic device or may be distributed across a plurality of electronic devices collectively configured to function as the circuitry of the computing device 104a. The plurality of processors may be in operative communication with each other and may be collectively configured to perform one or more functionalities of the circuitry of the computing device 104a, as described herein. In an exemplary embodiment, the second processor 1002 may be configured to execute instructions stored in the second memory device 1004 or otherwise accessible to the second processor 1002. These instructions, when executed by the second processor 1002, may cause the circuitry of the computing device 104a to perform one or more of the functionalities, as described herein.

Whether configured by hardware, firmware/software methods, or by a combination thereof, the second processor 1002 may include an entity capable of performing operations according to embodiments of the present disclosure while configured accordingly. Thus, for example, when the second processor 1002 is embodied as an ASIC, FPGA or the like, the second processor 1002 may include specifically configured hardware for conducting one or more operations described herein. Alternatively, as another example, when the second processor 1002 is embodied as an executor of instructions, such as may be stored in the second memory device 1004, the instructions may specifically configure the second processor 1002 to perform one or more algorithms and operations described herein.

Thus, the second processor 1002 used herein may refer to a programmable microprocessor, microcomputer or multiple processor chip or chips that can be configured by software instructions (applications) to perform a variety of functions, including the functions of the various embodiments described above. In some devices, multiple processors may be provided dedicated to wireless communication functions and one processor dedicated to running other applications. Software applications may be stored in the internal memory before they are accessed and loaded into the processors. The processors may include internal memory sufficient to store the application software instructions. In many devices, the internal memory may be a volatile or non-volatile memory, such as flash memory, or a mixture of both. The memory can also be located internal to another computing resource (e.g., enabling computer readable instructions to be downloaded over the Internet or another wired or wireless connection).

The second memory device 1004 may include suitable logic, circuitry, and/or interfaces that are adapted to store a set of instructions that is executable by the second processor 1002 to perform predetermined operations. Some of the commonly known memory implementations include, but are not limited to, a hard disk, random access memory, cache memory, read only memory (ROM), erasable programmable read-only memory (EPROM) & electrically erasable programmable read-only memory (EEPROM), flash memory, magnetic cassettes, magnetic tape, magnetic disk storage or other magnetic storage devices, a compact disc read only memory (CD-ROM), digital versatile disc read only memory (DVD-ROM), an optical disc, circuitry configured to store information, or some combination thereof. In an exemplary embodiment, the second memory device 1004 may be integrated with the second processor 1002 on a single chip, without departing from the scope of the disclosure.

The second transceiver 1006 may correspond to a communication interface that may facilitate transmission and reception of messages and data to and from various devices (e.g., computing devices 104). Examples of the second transceiver 1006 may include, but are not limited to, an antenna, an Ethernet port, a USB port, a serial port, or any other port that can be adapted to receive and transmit data. The second transceiver 1006 transmits and receives data and/or messages in accordance with the various communication protocols, such as, Bluetooth®, Infrared, I2C, TCP/IP, UDP, and 2G, 3G, 4G or 5G communication protocols.

The second meeting data monitoring unit 1008 may comprise suitable logic, circuitry, interfaces, and/or code that may configure the computing device 104a to monitor the meeting data generated by the computing device 104a. In an exemplary embodiment, the second meeting data monitoring unit 1008 may be configured to generate transcript from the meeting data using one or more known techniques. Additionally or alternatively, the second meeting data monitoring unit 1008 may be configured to timestamp the transcript in accordance with the time instant at which the computing device 104a generated the meeting data (from which the transcript was generated). The second meeting data monitoring unit 1008 may be implemented using Field Programmable Gate array (FPGA) and/or Application Specific Integrated Circuit (ASIC).

The second trigger event identification unit 1010 may comprise suitable logic, circuitry, interfaces, and/or code that may configure the computing device 104a to compare the transcript of the meeting data with the meeting metadata. Based on the comparison between the meeting metadata and the transcript of the meeting data, the second trigger identification unit 1010 may be configured to identify trigger event. In an exemplary embodiment, the second trigger event identification unit 1010 may be configured to receive an input from the participant of the computing device 104a. The second trigger identification unit 1010 may identify the received input as the trigger event. The second trigger event identification unit 1010 may be implemented using Field Programmable Gate array (FPGA) and/or Application Specific Integrated Circuit (ASIC).

The second recording unit 1012 may comprise suitable logic, circuitry, interfaces, and/or code that may configure the computing device 104a to generate a meeting snippet in response to the identification of the trigger event. In an exemplary embodiment, the second recording unit 1012 may be configured to record the meeting for a determined duration in order to generate the meeting snippet. The meeting snippet may correspond to a recording of a portion of the meeting. In an exemplary embodiment, the second recording unit 1012 may be configured to record a plurality of meeting snippets during a course of the meeting. The second recording unit 1012 may be implemented using Field Programmable Gate array (FPGA) and/or Application Specific Integrated Circuit (ASIC).

In operation, during the meeting, the computing device 104a may generate the meeting data. For example, the first processor 1002 may be configured to receive the audio of the participant through the audio capturing device in the computing device 104a. To this end, the second meeting data monitoring unit 1008 may be configured to utilize the STT to generate transcript of the audio content. In another embodiment, the participant may provide the input to share content being displayed on the display device of the computing device 104a. To this end, the second meeting data monitoring unit 1008 may be configured to perform OCR on the content displayed on the display device of the computing device 104a to generate the transcript. Additionally, or alternatively, the second meeting monitoring unit 1008 may be configured to receive the input corresponding to the meeting notes. In such an embodiment, the second meeting monitoring unit 1008 may be configured to consider the meeting notes as the transcript. In some examples, the second meeting monitoring unit 1008 may be configured to timestamp the transcript. The timestamp corresponds to a time instant at which the computing device 104a generates the meeting data.

Thereafter, the second trigger event identification unit 1010 may be configured to identify the trigger event based on the comparison between the meeting data and the meeting metadata. In some examples, the second trigger event identification unit 1010 may be configured to identify the trigger event based on the comparison between the transcript and the meeting metadata, as is described in FIG. 2. In another embodiment, the second trigger event identification unit 1010 may be configured to identify the trigger event based on the reception of the input from the participant. Additionally, based on the identification of the trigger event, the second trigger event identification unit 210 may be configured to associate the timestamp with the trigger event. In some examples, the second trigger event identification unit 210 may be configured to associate the timestamp of the transcript as the timestamp of the trigger event. In another embodiment, the second trigger event identification unit 210 may be configured to associate the time instant at which the trigger event was identified as the timestamp of the second trigger event identification unit 210.

In one embodiment, based on the identification of the trigger event, the second processor 1004 may be configured to transmit the timestamp, corresponding to the identification of the trigger event, to the central server 102. In some examples, the central server 102, upon receiving the timestamp, may cause the first recording unit 212 to record the meeting for the determined duration to generate the meeting snippet.

In an alternative embodiment, based on the identification of the trigger event, the second recoding unit 1012 may be configured to record the meeting for the determined duration, as is described above in FIG. 2. Recording of the meeting for the determined duration generates a meeting snippet. Thereafter, the second processor 1002 may be configured to transmit the meeting snippet to the central server 102.

Figure 11:
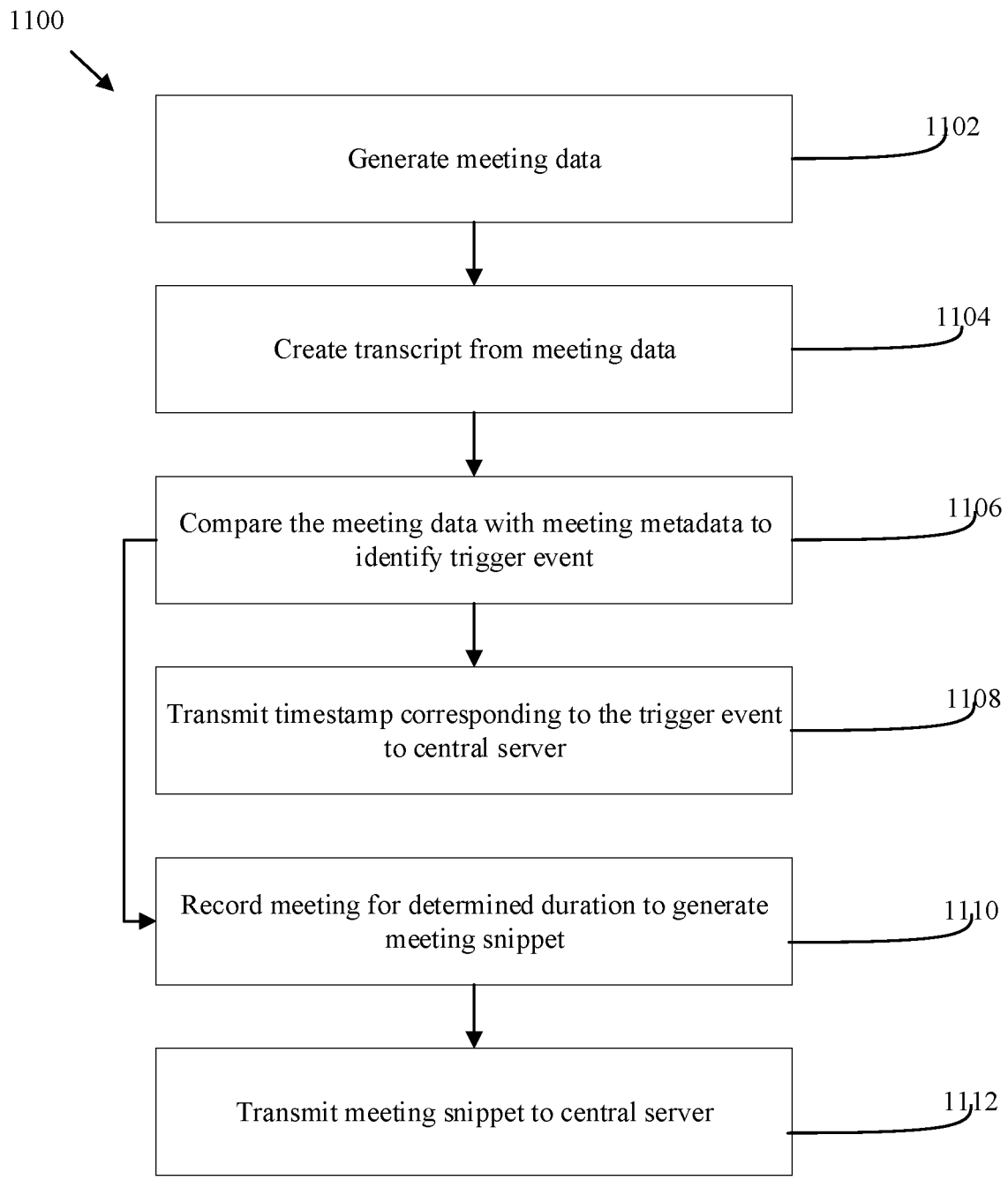
FIG. 11 is a flowchart illustrating operation of a computing device capturing meeting snippets, in accordance with an embodiment of the disclosure.

FIG. 11 is a flowchart illustrating operation of the computing device capturing meeting snippets, in accordance with an embodiment of the disclosure.

At 1102, the meeting data is generated. In an exemplary embodiment, the second processor 1002 may be configured to generate the meeting data during the meeting. At 1104, the transcript is created based on the meeting data. In an exemplary embodiment, the second meeting data monitoring unit 1008 may be configured to transform the meeting data to text. The text corresponds to the transcript. At 1106, the meeting data is compared with the meeting metadata to identify the trigger event, as is described in FIG. 2. In an exemplary embodiment, the second trigger event identification unit 1010 may be configured to identify the trigger event. Additionally, the second trigger event identification unit 1010 may be configured to determine the timestamp at which the trigger event is identified. At 1108, the timestamp corresponding to trigger event is transmitted to the central server 102. In an exemplary embodiment, the second processor 1002 may be configured to transmit the timestamp corresponding to the trigger event. In addition to transmitting the timestamp, the second processor 202 may be configured to transmit the meeting data to the central server 102, as and when the computing device 104a generates the meeting data.

In an alternative embodiment, at 1110, the meeting is recorded for the determined duration. In an exemplary embodiment, the second recording unit 1012 may be configured to record the meeting for the determined duration to generate the meeting snippet. At 1112, the meeting snippet is transmitted to the central server 102. In an exemplary embodiment, the second processor 1002 may be configured to transmit the meeting snippet to the central server 102.

Figure 12:
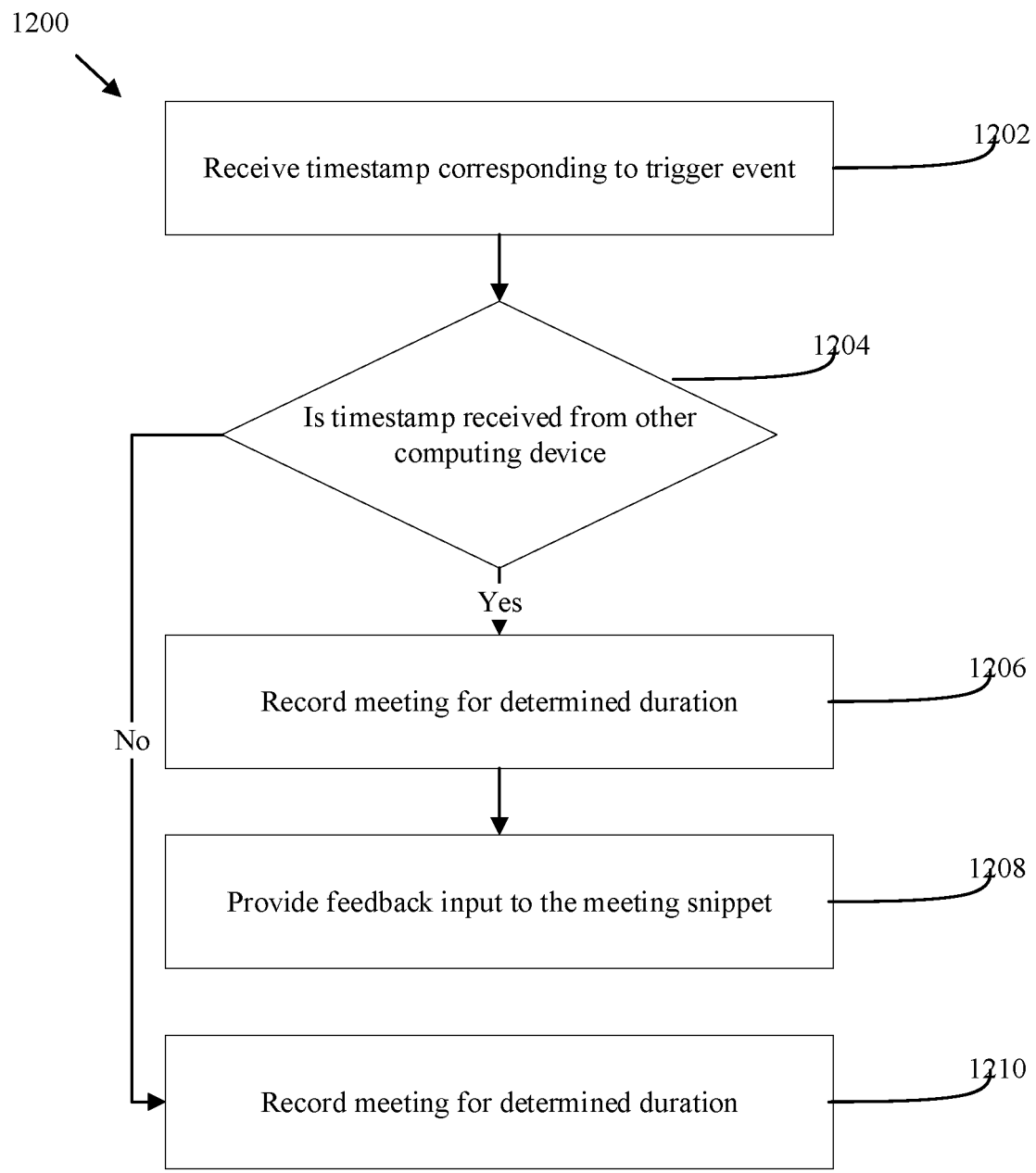
FIG. 12 is a flowchart of another method for operating a central server for capturing meeting snippets, in accordance with an embodiment of the disclosure.

FIG. 12 is a flowchart of another method for operating the central server for capturing meeting snippets, in accordance with an embodiment of the disclosure.

At step 1202, the timestamp corresponding to the trigger event is received. In an exemplary embodiment, the first processor 202 may be configured to receive the timestamp from the computing device 104a. At 1204, a check is performed to determine whether another timestamp is received from other computing devices 104 with a second time period of reception of the timestamp from the computing device 104a. In an exemplary embodiment, the first processor 202 may be configured to perform the determination. If the first processor 202 determines that the other timestamp corresponding to the trigger event is received from the other computing devices 104, the first processor 202 may be configured to perform the 1206. However, if the first processor 202 determines that the trigger event is received only from the computing device 104a, the first processor 202 may be configured to perform the 1210.

At 1206, the meeting is recorded for the determined duration to generate the meeting snippet. In an exemplary embodiment, the first recording unit 212 may be configured to record the meeting for the determined duration. At 1208, the feedback input is generated on the meeting snippet. In an exemplary embodiment, the first processor 202 may be configured to generate the feedback input on the meeting snippet.

At 1210, the meeting is recorded for the determined duration to generate the meeting snippet. In an exemplary embodiment, the first recording unit 212 may be configured to record the meeting for the determined duration.

Figure 13:
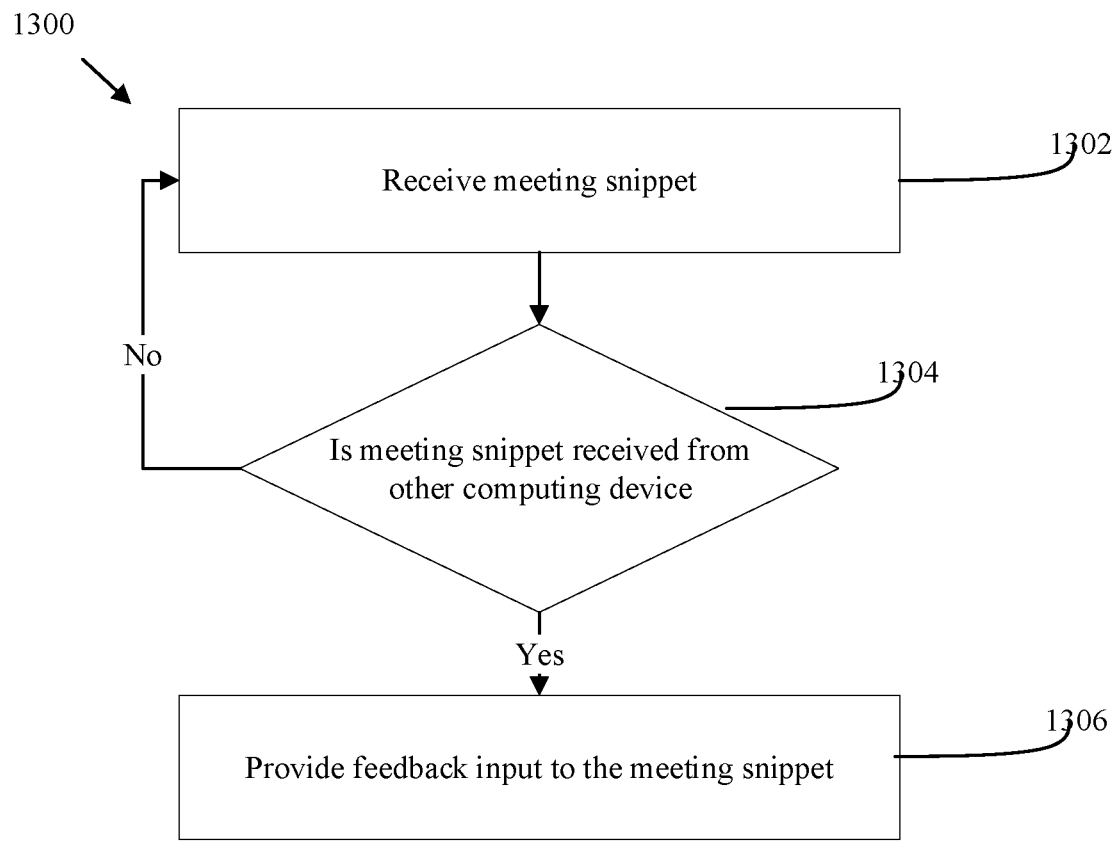
FIG. 13 is a flowchart of a method for operating the central server, according to one or more embodiments illustrated herein.

FIG. 13 illustrates a flowchart of a method for operating the central server, according to one or more embodiments illustrated herein.

At 1302, the meeting snippet is received. In an exemplary embodiment, the first processor 202 may be configured to receive the meeting snippet from the computing device 104a. At 1304, a determination is made as to whether the meeting snippet is received from other computing devices 104. In an exemplary embodiment, the first processor 202 may be configured to perform the check. If the first processor 202 determines that the meeting snippet is received from the other computing devices 104. The first processor 202 may be configured to perform 1306. However, if the first processor 202 determines that the meeting snippet is received only from the computing device 104a, the first processor 202 may be configured to repeat 1302. At 1306, the feedback input is generated on the meeting snippet. In an exemplary embodiment, the first processor 202 may be configured to generate the feedback input on the meeting snippet.

The foregoing method descriptions and the process flow diagrams are provided merely as illustrative examples and are not intended to require or imply that the operations of the various embodiments must be performed in the order presented. As will be appreciated by one of skill in the art, the operations may be performed in one or more different orders without departing from the various embodiments of the disclosure The hardware used to implement the various illustrative logics, logical blocks, modules, and circuits described in connection with the aspects disclosed herein may include a general purpose processor, a digital signal processor (DSP), a special-purpose processor such as an application specific integrated circuit (ASIC) or a field programmable gate array (FPGA), a programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, or in addition, some operations or methods may be performed by circuitry that is specific to a given function.

In one or more exemplary embodiments, the functions described herein may be implemented by special-purpose hardware or a combination of hardware programmed by firmware or other software. In implementations relying on firmware or other software, the functions may be performed as a result of execution of one or more instructions stored on one or more non-transitory computer-readable media and/or one or more non-transitory processor-readable media. These instructions may be embodied by one or more processor-executable software modules that reside on the one or more non-transitory computer-readable or processor-readable storage media. Non-transitory computer-readable or processor-readable storage media may in this regard comprise any storage media that may be accessed by a computer or a processor. By way of example but not limitation, such non-transitory computer-readable or processor-readable media may include RAM, ROM, EEPROM, FLASH memory, disk storage, magnetic storage devices, or the like. Disk storage, as used herein, includes compact disc (CD), laser disc, optical disc, digital versatile disc (DVD), floppy disk, and Blu-ray Disc™, or other storage devices that store data magnetically or optically with lasers. Combinations of the above types of media are also included within the scope of the terms non-transitory computer-readable and processor-readable media. Additionally, any combination of instructions stored on the one or more non-transitory processor-readable or computer-readable media may be referred to herein as a computer program product.

Many modifications and other embodiments of the inventions set forth herein will come to mind to one skilled in the art to which these inventions pertain having the benefit of teachings presented in the foregoing descriptions and the associated drawings. Although the figures only show certain components of the apparatus and systems described herein, it is understood that various other components may be used in conjunction with the supply management system. Therefore, it is to be understood that the inventions are not to be limited to the specific embodiments disclosed and that modifications and other embodiments are intended to be included within the scope of the appended claims. Moreover, the operations in the method described above may not necessarily occur in the order depicted in the accompanying diagrams, and in some cases one or more of the operations depicted may occur substantially simultaneously, or additional operations may be involved. Although specific terms are employed herein, they are used in a generic and descriptive sense only and not for purposes of limitation.

What is claimed is:

1. A method comprising:
receiving, by a processor, a request to generate a meeting session for a meeting;
determining, by the processor, a similarity score between a first vector associated with a meeting transcript and a second vector associated with a meeting metadata;
identifying, by the processor, a first trigger event based on a comparison of the similarity score with a threshold value,
wherein the first trigger event is indicative of at least a reference to the meeting metadata associated with the meeting;
recording, by the processor, the meeting for a determined duration to generate a plurality of meeting snippets, based on the identification of the first trigger event; and
generating a meeting summary, by the processor, based on aggregating the plurality of meeting snippets and the meeting metadata,
wherein the plurality of meeting snippets are aggregated based on a defined criteria.

2. The method of claim 1, wherein the first trigger event associated with a first participant comprises receiving an input from the first participant to record the meeting for the determined duration.

3. The method of claim 1, further comprising:
determining, by the processor, a timestamp associated with the first trigger event,
wherein the recording of the meeting includes a first content of a first determined duration chronologically prior to the timestamp and a second content of a second determined duration chronologically after the timestamp; and generating, by the processor, a meeting snippet based on the first content of the first determined duration recorded chronologically prior to the timestamp and the second content of the second determined duration.

4. The method of claim 1, further comprising comparing, by the processor, the first vector associated with the meeting transcript with the second vector associated with the meeting metadata,
   wherein the similarity score is determined based on the comparison of the first vector associated with the meeting transcript with the second vector associated with the meeting metadata, and
   wherein the similarity score corresponds to a cosine similarity between the first vector and the second vector.

5. The method of claim 1, wherein the meeting metadata associated with the meeting comprises at least an agenda of the meeting, one or more topics to be discussed during the meeting, a time duration of the meeting, a schedule of the meeting, and meeting notes carried forwarded from previous meetings.

6. The method of claim 1, further comprising categorizing, by the processor, a portion of the meeting transcript in one or more categories based on semantics associated with the portion of the meeting transcript, wherein the one or more categories comprises an action category, and wherein the categorization of the portion of the meeting transcript in the action category is indicative of a future action item for a plurality of participants.

7. The method of claim 6, wherein the identification of the first trigger event is further based on the categorization of the portion of the meeting transcript.

8. The method of claim 1, further comprising identifying, by the processor, a second trigger event associated with a second participant in the meeting,
   wherein the second trigger event is same as the first trigger event associated with a first participant.

9. The method of claim 8, further comprising generating, by the processor, a feedback input on the plurality of meeting snippets, based on the identification of the second trigger event.

10. The method of claim 1, further comprising sharing, by the processor, the plurality of meeting snippets over one or more social network platforms.

11. The method of claim 10, further comprising receiving, by the processor, feedback input on the plurality of meeting snippets.

12. The method of claim 1, further comprising generating, by the processor, the meeting transcript from meeting data generated during the meeting,
   wherein the meeting data comprises audio content, video content, meeting notes, presentation content, screen sharing content, and/or file sharing content, and
   wherein the first trigger event is identified further based on a categorization of the meeting transcript in one or more categories and a reception of an input from a computing device.

13. A central server comprising:
   a memory device configured to store a set of instructions;
   a processor communicatively coupled to the memory device, the processor configured to execute the set of instruction to:
      receive a request to generate a meeting session for a meeting;
      determine a similarity score between a first vector associated with a meeting transcript and a second vector associated with a meeting metadata;
      identify a first trigger event based on a comparison of the similarity score with a threshold value,
         wherein the first trigger event is indicative of at least a reference to the meeting metadata associated with the meeting;
      record the meeting for a determined duration to generate a plurality of meeting snippets, based on the identification of the first trigger event; and
      generate a meeting summary, by the processor, based on aggregating the plurality of meeting snippets and the meeting metadata,
         wherein the plurality of meeting snippets are aggregated chronologically based on a time stamp associated with generation of each of the plurality of meeting snippets.

14. The central server of claim 13, wherein the processor is further configured to:
   determine a timestamp associated with the first trigger event,
   wherein the recording of the meeting includes a first content of a first determined duration chronologically prior to the timestamp and a second content of a second determined duration chronologically after the timestamp; and
   generate a meeting snippet based on the first content of the first determined duration recorded chronologically prior to the timestamp and the second content of the second determined duration.

15. The central server of claim 13, wherein the processor is further configured to generate the meeting transcript from meeting data generated during the meeting,
   wherein the meeting data comprises audio content, video content, meeting notes, presentation content, screen sharing content, and/or file sharing content.

16. The central server of claim 15, wherein the processor is further configured to:
   compare the first vector associated with the meeting transcript with the second vector associated with the meeting metadata,
      wherein the similarity score is determined based on the comparison of the first vector associated with the meeting transcript with the second vector associated with the meeting metadata, and
      wherein the similarity score corresponds to a cosine similarity between the first vector and the second vector.

17. The central server of claim 16, wherein the processor is further configured to categorize a portion of the meeting transcript in one or more categories based on semantics associated with the portion of the meeting transcript,
   wherein the one or more categories comprises an action category, and
   wherein the categorization of the portion of the meeting transcript in the action category is indicative of a future action item for a plurality of participants.

18. The central server of claim 17, wherein the identification of the first trigger event is based on the categorization of the portion of the meeting transcript.

19. The central server of claim 13, wherein the processor is further configured to:
   identify a second trigger event associated with a second participant in the meeting, wherein the second trigger event is same as the first trigger event associated with a first participant; and
   generate a feedback input on the plurality of meeting snippets, based on the identification of the second trigger event.

20. The central server of claim 13, wherein the processor is further configured to share the plurality of meeting snippets over one or more social network platforms.

\* \* \* \* \*